United States Patent
Mino et al.

(10) Patent No.: US 12,478,433 B2
(45) Date of Patent: Nov. 25, 2025

(54) IMAGE GUIDANCE DURING CANNULATION

(71) Applicant: Olympus Corporation, Tokyo (JP)

(72) Inventors: Hiroyuki Mino, Westborough, MA (US); Hirokazu Horio, Allentown, PA (US); Brandon Ranalli, Quincy, MA (US); Mark Lavender, Plymouth, MN (US); Gloria Yee, Westborough, MA (US); Anthony R. Pirozzi, Raleigh, NC (US); Quinn C. Cartall, Atlanta, GA (US); Atanaska Gospodinova, Hamburg (DE); Katharina Dissmann, Aumühle (DE)

(73) Assignee: Olympus Corporation, Tokyo (JP)

( * ) Notice: Subject to any disclaimer, the term of this patent is extended or adjusted under 35 U.S.C. 154(b) by 52 days.

(21) Appl. No.: 18/047,555

(22) Filed: Oct. 18, 2022

(65) Prior Publication Data
US 2023/0123739 A1 Apr. 20, 2023

Related U.S. Application Data

(60) Provisional application No. 63/263,711, filed on Nov. 8, 2021, provisional application No. 63/262,796, filed on Oct. 20, 2021.

(51) Int. Cl.
*A61B 34/10* (2016.01)
*A61B 34/20* (2016.01)

(52) U.S. Cl.
CPC .............. *A61B 34/10* (2016.02); *A61B 34/20* (2016.02); *A61B 2034/107* (2016.02)

(58) Field of Classification Search
CPC ... A61B 1/000096; A61B 34/10; A61B 34/20; A61B 2034/107; A61B 2090/367;
(Continued)

(56) References Cited

U.S. PATENT DOCUMENTS

2010/0168561 A1* 7/2010 Anderson .............. A61B 90/36
600/424
2010/0298705 A1* 11/2010 Pelissier .............. A61B 8/4254
600/443
(Continued)

OTHER PUBLICATIONS

"GI Genius intelligent endoscopy module", Medtronic, [Online]. Retrieved from the Internet: <URL: https://www.medtronic.com/us-en/c/digestive-gastrointestinal/gi-genius.html>, (Accessed Aug. 26, 2021), 8 pgs.
(Continued)

*Primary Examiner* — Pascal M Bui Pho
*Assistant Examiner* — Nicholas A Robinson
(74) *Attorney, Agent, or Firm* — Schwegman Lundberg & Woessner, P.A.

(57) ABSTRACT

Systems, devices, and methods for integrating images from various sources and using the same to guide endoscopic procedures are disclosed. An endoscopic system comprises an endoscope to be positioned and navigated in a patient anatomy, and a processor configured to reconstruct a three-dimensional (3D) image of an anatomical target based on at least two images of the anatomical target. The at least two images can be calibrated and registered using respective landmarks. One or more secondary images can be integrated with the reconstructed 3D image. The reconstructed image or the integrated image, along with the endoscope navigation plan, can be displayed to a user. Based on the reconstructed or the integrated image, the processor can generate an endoscope navigation plan for use in an image-guided endoscopic procedure.

20 Claims, 10 Drawing Sheets

(58) Field of Classification Search
CPC .............. A61B 34/25; A61B 2090/376; A61B 1/00009; A61B 2034/105; A61B 2017/00026; A61B 2090/364
See application file for complete search history.

(56) References Cited

U.S. PATENT DOCUMENTS

| | | | | |
|---|---|---|---|---|
| 2019/0298451 | A1* | 10/2019 | Wong | A61B 1/05 |
| 2020/0012116 | A1 | 1/2020 | Fuerst et al. | |
| 2020/0152315 | A1* | 5/2020 | Shtirberg | A61B 18/1492 |
| 2020/0188032 | A1 | 6/2020 | Komp et al. | |
| 2020/0397529 | A1 | 12/2020 | Anderson et al. | |
| 2021/0196398 | A1* | 7/2021 | Ye | A61B 1/307 |
| 2022/0104884 | A1* | 4/2022 | Leiderman | G06T 7/11 |
| 2022/0287786 | A1* | 9/2022 | Zhan | A61B 1/00135 |
| 2024/0058062 | A1* | 2/2024 | Borsic | A61B 90/37 |
| 2024/0238049 | A1* | 7/2024 | Wong | A61B 34/10 |

OTHER PUBLICATIONS

Ma, Ruibin, et al., "Real-time 3D reconstruction of colonoscopic surfaces for determining missing regions", Winner of MICCAI Best Presentation Award, [Online]. Retrieved from the Internet: <URL: https://www.cs.unc.edu/Research/MIDAG/pubs/papers/RNNSLAM. pdf>, (2019), 9 pgs.

Takenaka, Mamoru, et al., "A novel teaching tool for visualizing the invisible bile duct axis in 3 dimensions during biliary cannulation (Compact Disc method)", Tool and Techniques, vol. 5, Issue 9, [Online]. Retrieved from the Internet: <URL: https://www.videogie. org/article/S2468-4481(20)30122-3/fulltext>, (Jun. 18, 20), 13 pgs.

Xie, Chunjing, et al., "Endoscope localization and gastrointestinal feature map construction based on monocular SLAM technology", Journal of Infection and Public Health, 13, [Online]. Retrieved from the Internet: <URL: https://www.sciencedirect.com/science/article/pii/S1876034119302321>, (2020), 1314-1321.

* cited by examiner

IMAGE GUIDANCE DURING CANNULATION

CROSS REFERENCE TO RELATED APPLICATIONS

This application is related to commonly assigned U.S. Provisional Patent Application Ser. No. 63/263,711, entitled "IMAGE GUIDANCE DURING CANNULATION", filed on Nov. 8, 2021, U.S. Provisional Patent Application Ser. No. 63/262,796, entitled "IMAGE GUIDANCE DURING CANNULATION", filed on Oct. 20, 2021, which are incorporated by reference in their entirety.

FIELD OF THE DISCLOSURE

The present document relates generally to endoscopic systems, and more particularly to systems and methods for integrating images from various sources and using the same to guide endoscopic procedures.

BACKGROUND

Endoscopes have been used in a variety of clinical procedures, including, for example, illuminating, imaging, detecting and diagnosing one or more disease states, providing fluid delivery (e.g., saline or other preparations via a fluid channel) toward an anatomical region, providing passage (e.g., via a working channel) of one or more therapeutic devices or biological matter collection devices for sampling or treating an anatomical region, and providing suction passageways for collecting fluids (e.g., saline or other preparations), among other procedures. Examples of such anatomical region can include gastrointestinal tract (e.g., esophagus, stomach, duodenum, pancreaticobiliary duct, intestines, colon, and the like), renal area (e.g., kidney(s), ureter, bladder, urethra) and other internal organs (e.g., reproductive systems, sinus cavities, submucosal regions, respiratory tract), and the like.

In endoscopy, the distal portion of the endoscope can be configured for supporting and orienting a therapeutic device, such as with the use of an elevator. In some systems, two endoscopes can work together with a first endoscope guiding a second endoscope inserted therein with the aid of the elevator. Such systems can be helpful in guiding endoscopes to anatomic locations within the body that are difficult to reach. For example, some anatomic locations can only be accessed with an endoscope after insertion through a circuitous path.

Peroral cholangioscopy is a technique that permits direct endoscopic visualization, diagnosis, and treatment of various disorders of patient biliary and pancreatic ductal system using miniature endoscopes and catheters inserted through the accessory port of a duodenoscope. Peroral cholangioscopy can be performed by using a dedicated cholangioscope that is advanced through the accessory channel of a duodenoscope, as used in Endoscopic Retrograde Cholangio-Pancreatography (ERCP) procedures. ERCP is a technique that combines the use of endoscopy and fluoroscopy to diagnose and treat certain problems of the biliary or pancreatic ductal systems, including the liver, gallbladder, bile ducts, pancreas, or pancreatic duct. In ERCP, an cholangioscope (also referred to as an auxiliary scope, or a "daughter" scope) can be attached to and advanced through a working channel of a duodenoscope (also referred to as a main scope, or a "mother" scope). Typically, two separate endoscopists operate each of the "mother-daughter" scopes. Although biliary cannulation can be achieved directly with the tip of the cholangioscope, most endoscopists prefer cannulation over a guidewire. A tissue retrieval device can be inserted through the cholangioscope to retrieve biological matter (e.g., gallstones, bill duct stones, cancerous tissue) or to manage stricture or blockage in bile duct.

Peroral cholangioscopy can also be performed by inserting a small-diameter dedicated endoscope directly into the bile duct, such as in a Direct Per-Oral Cholangioscopy (DPOC) procedure. In DPOC, a slim endoscope (cholangioscope) can be inserted into patient mouth, pass through the upper GI tract, and enter into the common bile duct for visualization, diagnosis, and treatment of disorders of the biliary and pancreatic ductal systems.

Endoscopic procedures such as ERCP and DPOC use two-dimensional (2D) endoscopic images or video frames and fluoroscopy images to guide cannulation and navigation. Such 2D images generally lack details of the anatomy of interest, such as shape, depth, and various structural or geometric characteristics. Enhanced visualization of patient anatomy is desired in image-guided endoscopic procedures.

SUMMARY

The present disclosure recognizes several technological problems to be solved with endoscopes, such as duodenoscopes used for diagnostics and retrieval of sample biological matter. One of such problems is increased difficulty in navigating endoscopes, and instruments inserted therein, to locations in anatomical regions deep within a patient. For example, in ERCP procedures, as the duodenoscope, the cholangioscope, and the tissue retrieval device become progressively smaller due to being inserted sequentially in progressively smaller lumens, it has become more difficult to maneuver and navigate the endoscope through the patient anatomy, maintain endoscope stabilization, and maintain correct cannulation position in a narrow space (e.g., the bile duct). It can also be difficult to maintain an appropriate cannulation angle due to limited degree of freedom in scope elevator. Cannulation and endoscope navigation require advanced surgical skills and manual dexterity, which can be particularly challenging for less-experienced operating physicians (e.g., surgeons or endoscopists).

Another challenge in endoscopy is a high degree of variability of patient anatomy, especially patients with surgically altered or otherwise difficult anatomy. For example, in ERCP procedures, some patients may have altered anatomy to a portion of the GI tract or the pancreaticobiliary system (e.g., the ampulla). In some patients, stricture ahead of pancreas can compress the stomach and part of duodenum, making it difficult to navigate the duodenoscope in a limited lumen of the compressed duodenum and to navigate the cholangioscope to reach the duodenal papilla, the point where the dilated junction of the pancreatic duct and the bile duct (ampulla of Vater) enter the duodenum. In another example, some patients have alternated papilla anatomy. With the duodenoscope designed to be stable in the duodenum, it can be more difficult to reach the duodenal papilla in surgically altered anatomy. Endoscopic systems generally lack the capability of providing cannulation and endoscope navigation guidance based on patient's unique anatomy.

Endoscopic systems also lack advanced visual acuity or visualization capabilities. For example, ERCP uses two-dimensional (2D) endoscopic images (or frames of endoscopic video) and fluoroscopy images to guide cannulation and endoscope navigation. Such 2D images cannot provide direct and explicit three-dimensional (3D) form of observation and spatial details, such as shape, depth, and structural or geometric characteristics of an anatomical target. The small field of view and the lack of spatial and topological information make it difficult for the physician to conceive a complete picture of the anatomical target (e.g., duodenal papilla in an ERCP procedure). Instead, the physician usually needs to perform extra procedure to presume, or mentally reconstruct, a 3D shape of the observed anatomy. However, as such 2D images of different modalities (e.g., endoscopic images and fluoroscopy images) are separately acquired and usually neither calibrated or properly registered or aligned, mental 3D reconstruction from the 2D images is not only burdensome and time-consuming, but the interpretation can also be highly variable among physicians due to their different experiences and skill levels. Moreover, at least because the 2D images of different sources are not calibrated or registered, simple operations like overlapping the 2D to each other may not produce a desired visualization quality.

Capsule Endoscopy has been used to examine the lining of a portion of a patient gastrointestinal (GI) tract such as the small intestine by using a pill-sized video camera. Once swallowed, the camera can take images or video of the small intestine as it passes through, and transmit the images to a wearable recording device. Although such pill-sized camera can look at surfaces, it generally does not provide detailed information about the shape or fold structure.

The lack of advanced visualization in endoscopy systems as stated above limits the capability and usability of image-guided target anatomy recognition and endoscope navigation. The present disclosure can help solve these and other problems by providing systems, devices and methods for multi-modality 3D image reconstruction and image integration using various image sources, and using such reconstructed or integrated 3D images to guide cannulation or navigation in an endoscopic procedure like an ERCP procedure. According to one embodiment disclosed herein, an endoscopic system comprises an endoscope to be positioned and navigated in a patient anatomy, and a processor configured to reconstruct a three-dimensional (3D) image of an anatomical target based on at least two images of the anatomical target. In an example, the at least two images can include two two-dimensional (2D) images. In an example, the at least two images can include at least one existing 3D image. The at least two images can be calibrated and registered using respective landmarks. In some examples, one or more secondary images generated by imaging devices other than the endoscope can be integrated with the reconstructed 3D image. In an example, an artificial intelligence (AI) technology may be used to reconstruct the 3D image or to integrate images from different sources, such as by using a trained machine-learning (ML) model. In some examples, a trained ML model may be used to generate an endoscope navigation plan. The reconstructed image or the integrated image, along with the endoscope navigation plan, can be displayed to a user. Based on the reconstructed or the integrated image, the processor can generate an endoscope navigation plan for use in an image-guided endoscopic procedure.

The present disclosure provides a tool to a physician to better visualize and appreciate topography of target anatomy and its surrounding environment. Compared to 2D endoscopic images and fluoroscopy images, the reconstructed or integrated 3D images can be observed more intuitively and objectively with addition of 3D shape, depth, and structural details of the target anatomy, and enhance the visualization capabilities of an endoscopic system. The reconstructed or integrated 3D images also help ease physician burden of performing extra procedure to presume, or mentally reconstruct, 3D structure of the observed anatomy, and reduce inter-physician variations in image interpretation. Integration of secondary images (e.g., computer-tomography (CT) scan images, magnetic resonance imaging (MRI) scan images, or an endoscopic ultrasonography (EUS) images) into the reconstructed 3D image may provide more complete location and structural information of the target anatomy. The enhanced visualization as described in this document can improve target anatomy recognition, maintain correction cannulation position and direction, and provide more robust and precise cannulation and endoscope navigation. As a result, the overall procedure success rate can be increased and patient outcome can be improved.

Example 1 is an image-guided endoscopic system, comprising: an endoscope configured to be positioned and navigated in a patient anatomy; a processor configured to: receive at least two images of an anatomical target; reconstruct a three-dimensional (3D) image of the anatomical target using the at least two received images; and generate an endoscope navigation plan for positioning and navigating the endoscope based at least on the reconstructed 3D image of the anatomical target; and an output unit configured to display the reconstructed 3D image and the endoscope navigation plan.

In Example 2, the subject matter of Example 1 optionally includes, wherein to reconstruct the 3D image of the anatomical target, the processor is further configured to: detect respective landmarks from the at least two received images; and register one of the at least two received images to another of the at least two received images using the respective detected landmarks.

In Example 3, the subject matter of any one or more of Examples 1-2 optionally includes the endoscope that can be configured to be positioned and navigated in a pancreaticobiliary system of the patient.

In Example 4, the subject matter of any one or more of Examples 1-3 optionally includes the endoscope that can include an imaging sensor, and the at least two received images include at least one endoscopic image of the anatomical target generated by the imaging sensor.

In Example 5, the subject matter of any one or more of Examples 1-4 optionally includes the at least two received images that can include at least one fluoroscopic image of the anatomical target.

In Example 6, the subject matter of any one or more of Examples 1-5 optionally includes: the at least two received images that can include at least one electrical potential map or an electrical impedance map of the anatomical target; and the processor that can be configured to infer anatomical information from the electrical potential map or an electrical impedance map, and to reconstruct the 3D image of the anatomical target using the inferred anatomical information.

In Example 7, the subject matter of any one or more of Examples 1-6 optionally includes the at least two received images that can include first and second two-dimensional (2D) images.

In Example 8, the subject matter of any one or more of Examples 1-7 optionally includes the at least two received images that can include a first two-dimensional (2D) image and a second three-dimensional (3D) image.

In Example 9, the subject matter of any one or more of Examples 1-8 optionally includes the at least two received images that can in include first and second three-dimensional (3D) images.

In Example 10, the subject matter of any one or more of Examples 1-9 optionally includes the at least two received images that can include images from different sources or with different modalities.

In Example 11, the subject matter of any one or more of Examples 1-10 optionally includes the processor that can be configured to: receive one or more secondary images of the anatomical target generated by an imaging device other than the endoscope; integrate the reconstructed 3D image with the one or more secondary images; and generate the endoscope navigation plan based at least on the integrated reconstructed 3D image of the anatomical target.

In Example 12, the subject matter of Example 11 optionally includes the secondary image that can include one or more of: a computer-tomography (CT) scan image; a magnetic resonance imaging (MRI) scan image; a magnetic resonance cholangiopancreatography (MRCP) image; or an endoscopic ultrasonography (EUS) image.

In Example 13, the subject matter of any one or more of Examples 11-12 optionally includes the processor that can be further configured to generate an integrated reconstructed 3D image by superimposing the reconstructed 3D image over the one or more secondary images.

In Example 14, the subject matter of any one or more of Examples 11-13 optionally includes the processor that can be further configured to generate the integrated reconstructed 3D image by applying the reconstructed 3D image and the secondary image to a trained machine-learning model.

In Example 15, the subject matter of any one or more of Examples 1-14 optionally includes, wherein to generate an endoscope navigation plan includes to automatically recognize the anatomical target, and automatically recognize the anatomical target, and to estimate one or more navigation parameters including: a distance of an endoscope distal portion relative to an anatomical target; a heading direction of the endoscope distal portion relative to the anatomical target; an angle of cannula or a surgical element; a protrusion amount of a cannula or a surgical element; a speed or force applied to the endoscope distal portion or a surgical element; a rotational direction or a cutting area of a surgical element; or a projected navigation path toward the anatomical target.

In Example 16, the subject matter of any one or more of Examples 1-15 optionally includes the processor that can be configured to generate the endoscope navigation plan by applying the reconstructed 3D image to a trained machine-learning model, the trained machine-learning model being trained to establish a relationship between (i) images or image features representing variants of the anatomical target, and (ii) endoscope navigation plans for the variants of the anatomical target.

In Example 17, the subject matter of Example 16 optionally includes the processor that can be configured to train the machine-learning model using a training dataset comprising procedure data from past endoscopic procedures on a plurality of patients, the procedure data including (i) images of anatomical targets of the plurality of patient and (ii) corresponding endoscope navigation plans.

In Example 18, the subject matter of any one or more of Examples 1-17 optionally includes the output unit that can be configured to automatically adjust the display of the reconstructed 3D image according to the endoscope navigation plan.

In Example 19, the subject matter of Example 18 optionally includes, wherein to automatically adjust the display includes to automatically zoom a portion of the reconstructed 3D image based on a position or a direction of a distal portion of the endoscope relative to an anatomical target.

In Example 20, the subject matter of any one or more of Examples 1-19 optionally includes the output unit that can be further configured to display one or more visual indications overlaid upon the reconstructed 3D image, the one or more visual indications including: an anatomical target; a projected navigation path toward the anatomical target; or a progress of the endoscope advancing toward the anatomical target along the projected navigation path.

In Example 21, the subject matter of any one or more of Examples 1-20 optionally includes a feedback generator that can be configured to generate a human-perceptible feedback including one or more of an audio feedback, a visual feedback, or a haptic feedback when navigating the endoscope in the anatomical target.

In Example 22, the subject matter of Example 21 optionally includes the feedback generator that can be configured to automatically adjust a vibration strength on a handle portion of the endoscope based on a distance between a distal portion of the endoscope and an anatomical critical zone.

Example 23 is a method of planning an endoscopic procedure using an image-guided endoscopic system. The method comprises steps of: receiving at least two images of an anatomical target; reconstructing, via a processor included in the image-guided endoscopic system, a three-dimensional (3D) image of the anatomical target using the at least two received images; generating an endoscope navigation plan for positioning and navigating the endoscope based at least on the reconstructed 3D image of the anatomical target; and displaying the reconstructed 3D image and the endoscope navigation plan on a display.

In Example 24, the subject matter of Example 23 optionally includes reconstructing the 3D image that can include: detecting respective landmarks from the at least two received images; and registering one of the at least two received images to another of the at least two received images using the respective detected landmarks.

In Example 25, the subject matter of any one or more of Examples 23-24 optionally includes the at least two received images that can include one or more of an endoscopic image, a fluoroscopic image, an electrical potential map, or an electrical impedance map of the anatomical target.

In Example 26, the subject matter of any one or more of Examples 23-25 optionally includes the at least two received images that can include first and second two-dimensional (2D) images.

In Example 27, the subject matter of any one or more of Examples 23-26 optionally includes the at least two received images that can include a first two-dimensional (2D) image and a second three-dimensional (3D) image.

In Example 28, the subject matter of any one or more of Examples 23-27 optionally includes the at least two received images that can include first and second three-dimensional (3D) images.

In Example 29, the subject matter of any one or more of Examples 23-28 optionally includes the at least two received images that can include images from different sources or with different modalities.

In Example 30, the subject matter of any one or more of Examples 23-29 optionally includes receiving one or more secondary images of the anatomical target, and integrating the reconstructed 3D image with the one or more secondary images, wherein generating the endoscope navigation plan is further based on the integrated reconstructed 3D image of the anatomical target.

In Example 31, the subject matter of Example 30 optionally includes integrating the reconstructed 3D image with the one or more secondary images that can include superimposing the reconstructed 3D image over the one or more secondary images.

In Example 32, the subject matter of any one or more of Examples 30-31 optionally includes integrating the reconstructed 3D image with the one or more secondary images by applying the reconstructed 3D image and the one or more secondary images to a trained machine-learning model.

In Example 33, the subject matter of any one or more of Examples 23-32 optionally includes generating the endoscope navigation plan that can include automatically recognizing the anatomical target, and estimating one or more navigation parameters.

In Example 34, the subject matter of any one or more of Examples 23-33 optionally includes generating the endoscope navigation plan by applying the reconstructed 3D image to a trained machine-learning model, the trained machine-learning model being trained to establish a relationship between (i) images or image features representing variants of the anatomical target, and (ii) endoscope navigation plans for the variants of the anatomical target.

In Example 35, the subject matter of any one or more of Examples 23-34 optionally includes automatically zooming a portion of the reconstructed 3D image based on a position or a direction of a distal portion of the endoscope relative to an anatomical target.

In Example 36, the subject matter of any one or more of Examples 23-35 optionally includes displaying one or more visual indications overlaid upon the reconstructed 3D image, the one or more visual indications including: an anatomical target; a projected navigation path toward the anatomical target; or a progress of the endoscope advancing toward the anatomical target along the projected navigation path.

In Example 37, the subject matter of any one or more of Examples 23-36 optionally includes generating a human-perceptible feedback including one or more or an audio feedback, a visual feedback, or a haptic feedback when navigating the endoscope in the anatomical target.

In Example 38, the subject matter of Example 37 optionally includes generating the human-perceptible feedback that can include automatically adjusting a vibration strength on a handle portion of the endoscope based on a distance between a distal portion of the endoscope and an anatomical critical zone.

The presented techniques are described in terms of health-related procedures, but are not so limited. This summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

DETAILED DESCRIPTION

This document describes systems, devices, and methods for enhancing visualization with integrated images from various sources, and use the same to guide endoscopic procedures. According to one embodiment, an endoscopic system can comprise an endoscope configured to be positioned in and navigated through a patient anatomy (e.g., a duodenoscope or a cholangioscope for use in an ERCP procedure), and a processor to reconstruct a three-dimensional (3D) image of an anatomical target using at least two images of the anatomical target. The at least two images may be from the same or different sources with the same or different modalities. The reconstruction can include registering the at least two images using landmark detected from respective images. The processor can generate an endoscope navigation plan based at least on the reconstructed 3D image of the patient anatomy. According to some examples, the processor can integrate the reconstructed 3D image with one or more secondary images of the anatomical target provided by imaging devices other than the endoscope, and generate the endoscope navigation plan based on the integrated image. The reconstructed or integrated 3D images and the endoscope navigation plan can be presented to the operating physician, such as displayed on a user interface.

Figure 1:
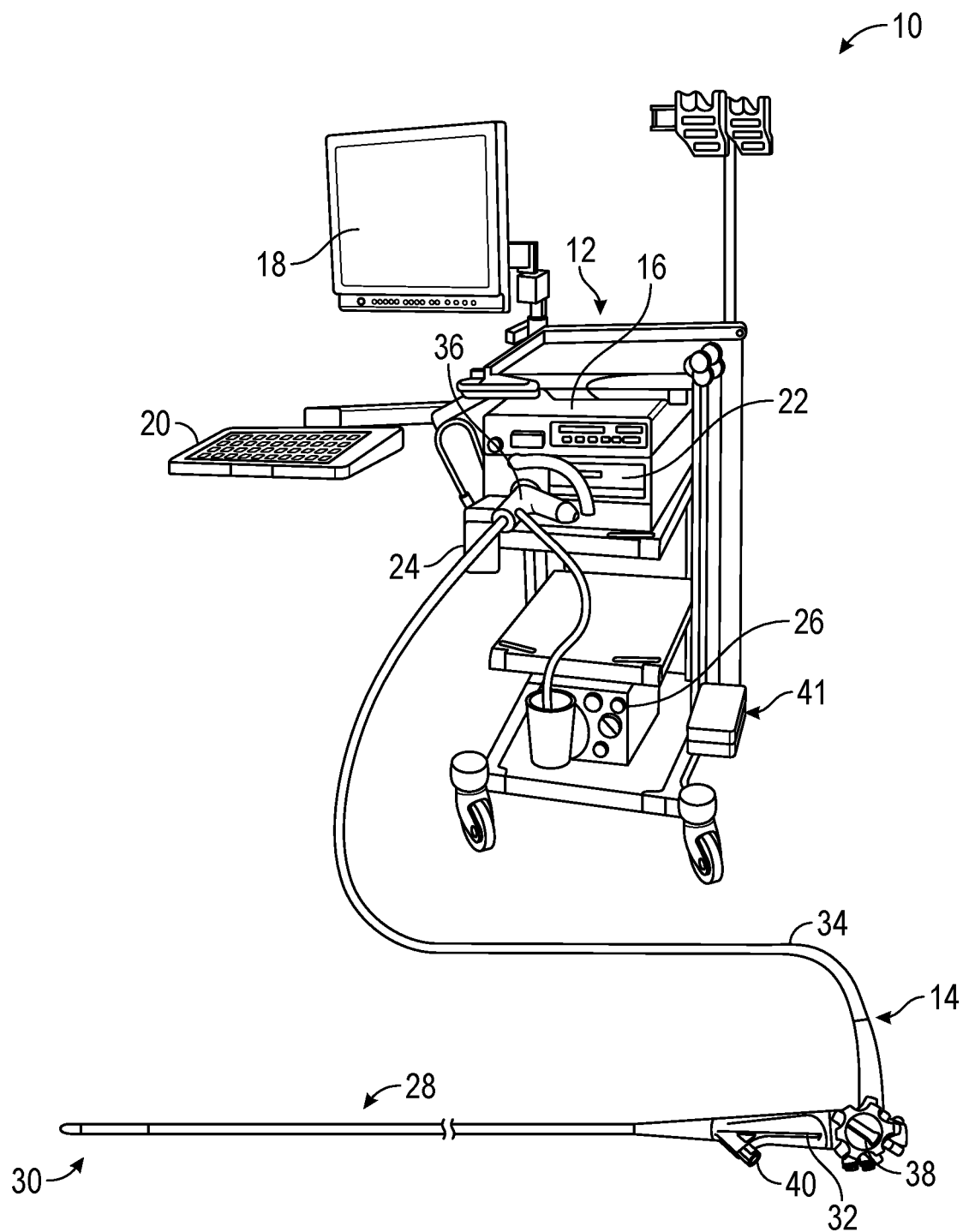
FIGS. 1-2 are schematic diagrams illustrating an example of an endoscopy system for use in endoscopic procedures such as an ERCP procedure.

FIG. 1 is a schematic diagram illustrating an example of an endoscopy system 10 for use in endoscopic procedures, such as an ERCP procedure. The system 10 comprises an imaging and control system 12 and an endoscope 14. The endoscopy system 10 is an illustrative example of an endoscopy system suitable for patient diagnosis and/or treatment using the systems, devices and methods described herein, such as tethered and optically enhanced biological matter and tissue collection, retrieval and storage devices and biopsy instruments that can be used for obtaining samples of tissue or other biological matter to be removed from a patient for analysis or treatment of the patient. According to some examples, the endoscope 14 can be insertable into an anatomical region for imaging and/or to provide passage of or attachment to (e.g., via tethering) one or more sampling devices for biopsies, or one or more therapeutic devices for treatment of a disease state associated with the anatomical region.

The imaging and control system 12 can comprise a control unit 16, an output unit 18, an input unit 20, a light source 22, a fluid source 24, and a suction pump 26. The imaging and control system 12 can include various ports for coupling with endoscopy system 10. For example, the control unit 16 can include a data input/output port for receiving data from and communicating data to the endoscope 14. The light source 22 can include an output port for transmitting light to the endoscope 14, such as via a fiber optic link. The fluid source 24 can comprise one or more sources of air, saline or other fluids, as well as associated fluid pathways (e.g., air channels, irrigation channels, suction channels) and connectors (barb fittings, fluid seals, valves and the like). The fluid source 24 can be in communication with the control unit 16, and can transmit one or more sources of air or fluids to the endoscope 14 via a port. The fluid source 24 can comprise a pump and a tank of fluid or can be connected to an external tank, vessel or storage unit. The suction pump 26 can comprise a port used to draw a vacuum from the endoscope 14 to generate suction, such as for withdrawing fluid from the anatomical region into which the endoscope 14 is inserted.

The output unit 18 and the input unit 20 can be used by an operator of endoscopy system 10 to control functions of endoscopy system 10 and view output of the endoscope 14. In some examples, the control unit 16 can additionally be used to generate signals or other outputs for treating the anatomical region into which the endoscope 14 is inserted. Examples of such signals or outputs can include electrical output, acoustic output, a radio-frequency energy output, a fluid output and the like for treating the anatomical region with, for example, cauterizing, cutting, freezing and the like.

The endoscope 14 can interface with and connect to the imaging and control system 12 via a coupler section 36. In the illustrated example, the endoscope 14 comprises a duodenoscope that may be use in a ERCP procedure, though other types of endoscopes can be used with the features and teachings of the present disclosure. The endoscope 14 can comprise an insertion section 28, a functional section 30, and a handle section 32, which can be coupled to a cable section 34 and the coupler section 36.

Figure 4:
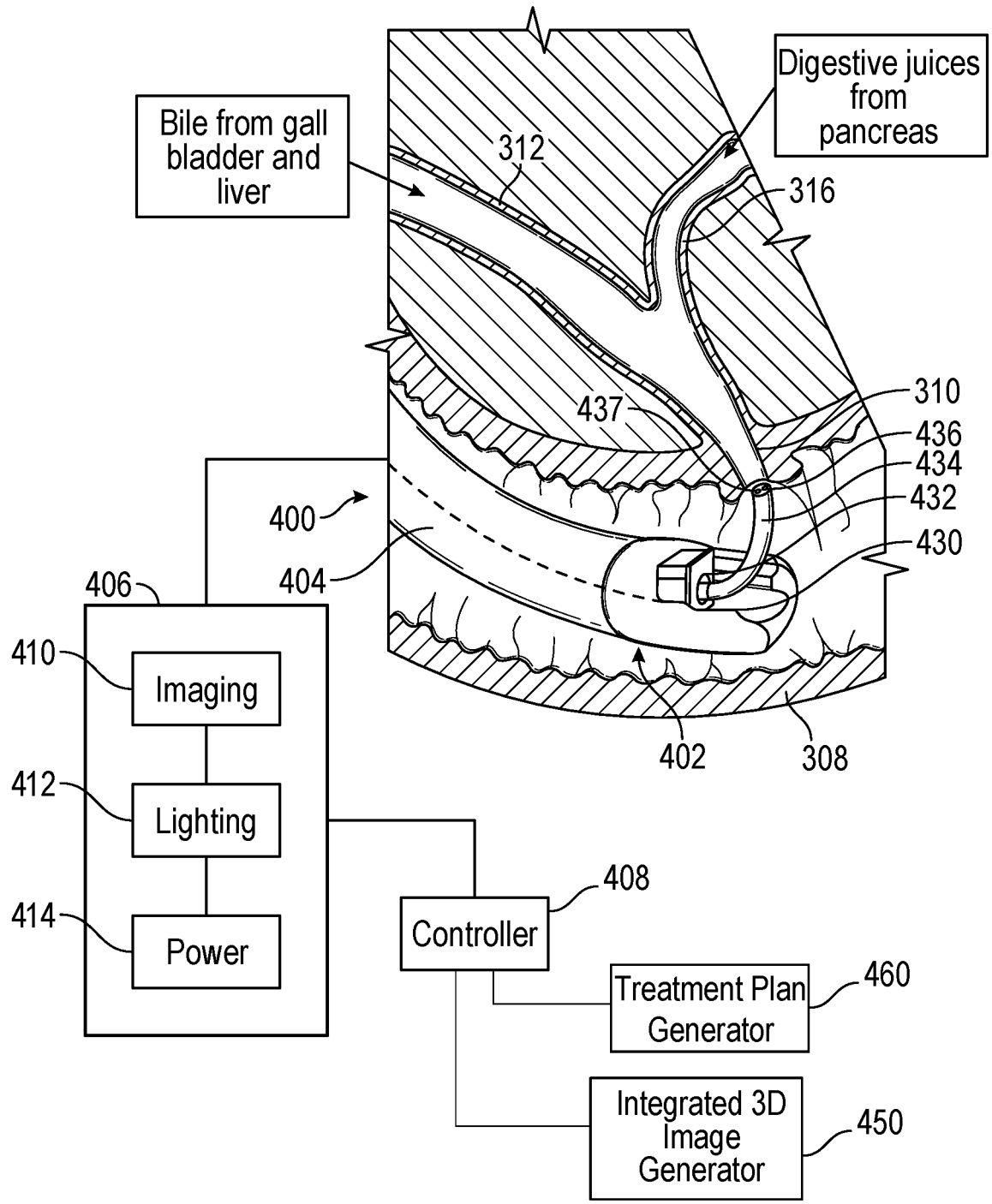
FIG. 4 is a diagram illustrating an example of mother-daughter endoscopes used in an ERCP procedure, and a portion of patient anatomy where the procedure is performed.

The insertion section 28 can extend distally from the handle section 32, and the cable section 34 can extend proximally from the handle section 32. The insertion section 28 can be elongate and include a bending section, and a distal end to which functional section 30 can be attached. The bending section can be controllable (e.g., by control knob 38 on the handle section 32) to maneuver the distal end through tortuous anatomical passageways (e.g., stomach, duodenum, kidney, ureter, etc.). Insertion section 28 can also include one or more working channels (e.g., an internal lumen) that can be elongate and support insertion of one or more therapeutic tools of functional section 30, such as a cholangioscope as shown in FIG. 4. The working channel can extend between handle section 32 and functional section 30. Additional functionalities, such as fluid passages, guide wires, and pull wires can also be provided by insertion section 28 (e.g., via suction or irrigation passageways, and the like).

The handle section 32 can comprise a control knob 38 and ports 40. The ports 40 can be configured to couple various electrical cables, guide wires, auxiliary scopes, tissue collection devices of the present disclosure, fluid tubes and the like to handle section 32 for coupling with insertion section 28. The control knob 38 can be coupled to a pull wire, or other actuation mechanisms, extending through insertion section 28. The control knob 38 can be used by a user to manually advance or retreat the insertion section 28 of the endoscope 14, and to adjust bending of a bending section at the distal end of the insertion section 28. In some examples, an optional drive unit 46 (FIG. 2) can be used to provide motorized drive for advancing a distal section of endoscope 14 under the control of the control unit 16.

The imaging and control system 12, according to examples, can be provided on a mobile platform (e.g., cart 41) with shelves for housing light source 22, suction pump 26, image processing unit 42 (FIG. 2), etc. Alternatively, several components of the imaging and control system 12 shown in FIGS. 1 and 2 can be provided directly on the endoscope 14 such that the endoscope is "self-contained."

The functional section 30 can comprise components for treating and diagnosing anatomy of a patient. The functional section 30 can comprise an imaging device, an illumination device, and an elevator. The functional section 30 can further comprise optically enhanced biological matter and tissue collection and retrieval devices. For example, the functional section 30 can comprise one or more electrodes conductively connected to handle section 32 and functionally connected to the imaging and control system 12 to analyze biological matter in contact with the electrodes based on comparative biological data stored in the imaging and control system 12. In other examples, the functional section 30 can directly incorporate tissue collectors.

Figure 2:
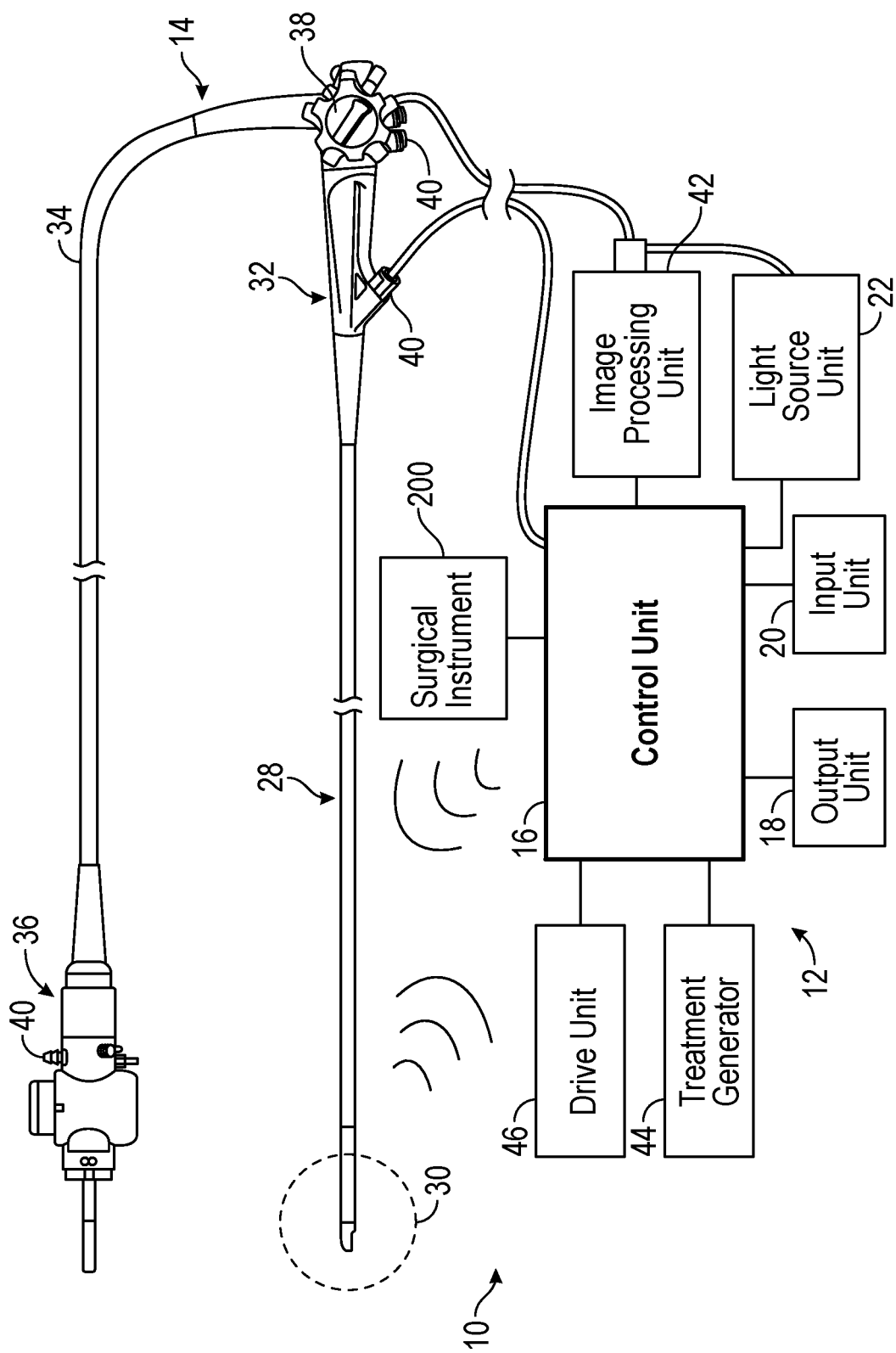

FIG. 2 is a schematic diagram of the endoscopy system 10 shown in FIG. 1, which comprises the imaging and control system 12 and the endoscope 14. FIG. 2 schematically illustrates components of the imaging and control system 12 coupled to the endoscope 14, which in the illustrated example comprises a duodenoscope. The imaging and control system 12 can comprise a control unit 16, which can include or be coupled to an image processing unit 42, a treatment generator 44, and a drive unit 46, as well as the light source 22, the input unit 20, and the output unit 18 as discussed above with reference to FIG. 1. The control unit 16 can comprise, or can be in communication with, a surgical instrument 200 comprising a device configured to engage tissue and collect and store a portion of that tissue and through which an imaging device (e.g., a camera) can view target tissue via inclusion of optically enhanced materials and components. The control unit 16 can be configured to activate an imaging device (e.g., a camera) at the functional section of the endoscope 14 to view target tissue distal of surgical instrument 200 and endoscopy system 10, which can be fabricated of a translucent material to minimize the impacts of the camera being obstructed or partially obstructed by the tissue retrieval device. Likewise, the control unit 16 can be configured to activate the light source 22 to shine light on the surgical instrument 200, which can include select components that are configured to reflect light in a particular manner, such as tissue cutters being enhanced with reflective particles.

The image processing unit 42 and the light source 22 can each interface with the endoscope 14 (e.g., at the functional section 30) by wired or wireless electrical connections. The imaging and control system 12 can accordingly illuminate an anatomical region using the light source 22, collect signals representing the anatomical region, process signals representing the anatomical region using the image processing unit 42, and display images representing the anatomical region on the output unit 18. The imaging and control system 12 can include the light source 22 to illuminate the anatomical region using light of desired spectrum (e.g., broadband white light, narrow-band imaging using preferred electromagnetic wavelengths, and the like). The imaging and control system 12 can connect (e.g., via an endoscope connector) to the endoscope 14 for signal transmission (e.g., light output from light source, video signals from the imaging device such as positioned at the distal portion of the endoscope 14, diagnostic and sensor signals from a diagnostic device, and the like).

In some examples, the image processing unit 42 can reconstruct a 3D image using two or more images of an anatomical target, such as two or more 2D images. The 2D images can be from the same or different sources with the same or different modalities, which may include, for example, a fluoroscopic image, and an endoscopic image generated by the imaging device (e.g., a camera) on the endoscope 14. In some examples, at least some of the 2D images used for reconstructing the 3D image can be of the same modality. To reconstruct a 3D image, the image processing unit 42 may register a first 2D image to a second 2D image with respect to respective landmarks on the first and second 2D images, and apply a plurality of registered 2D images to a reconstruction model to create a 3D image. In some examples, the two or more images used for reconstructing the 3D image may include at least one existing 3D image obtained by using, for example, an external imaging device of equipment, such as a CT scanner, an MRI scanner, X-ray equipment, or a nuclear-medicine camera, among others.[1] For example, the image processing unit 42 can reconstruct a 3D image using at least one 2D image and at least one existing 3D image, or in another example, using at least two existing 3D images.

[1] Echoing new claim 1.

In some examples, the image processing unit 42 can integrate the reconstructed 3D image with one or more secondary images generated by external imaging devices other than endoscope. Examples of the secondary images may include a CT image, an MRI image or an image obtained from specialized MRI such as a Magnetic resonance cholangiopancreatography (MRCP) procedure, or an endoscopic ultrasonography (EUS) image. Such images are referred to as secondary images to distinguish from images from primary sources such as endoscopic images.

The treatment generator 44 can generate a treatment plan, which can be used by the control unit 16 to control the operation of the endoscope 14, or to provide with the operating physician a guidance for maneuvering the endoscope 14, during an endoscopic procedure. In an example, the treatment generator 44 can generate an endoscope navigation plan using one or more of the reconstructed 3D image, one or more 2D images, and/or the integrated image from different sources. The endoscope navigation plan may include suggested values for one or more cannulation or navigation parameters based on the analysis of the reconstructed or integrated image. Examples of reconstructing a 3D image and integrating different images sources, and using such images to guide cannulation or navigation in an endoscopic procedure are discussed below with reference to FIGS. 4-5.

Figure 3A:
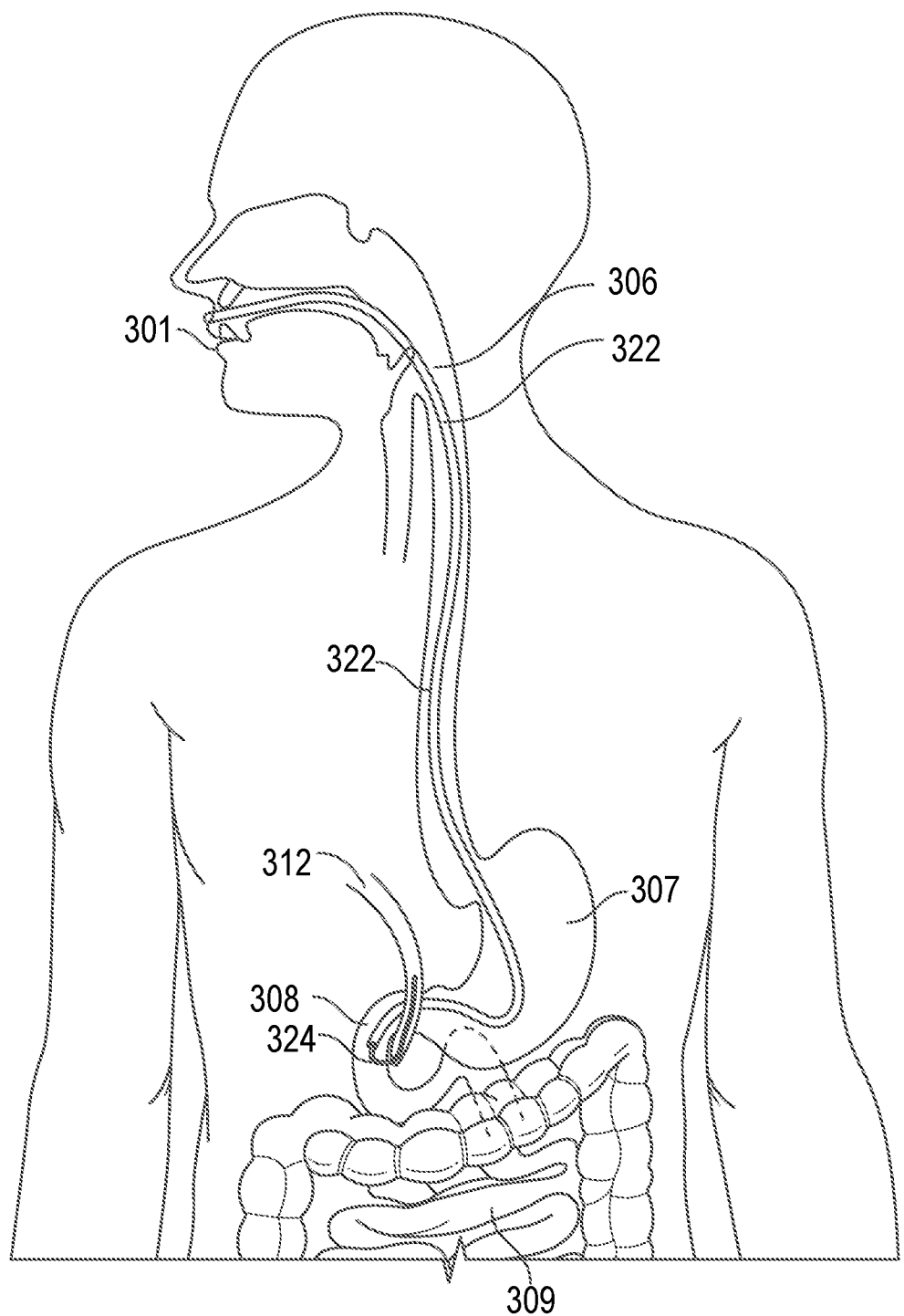
FIGS. 3A-3B are diagrams illustrating an example of peroral cholangioscopy involving direct insertion of a cholangioscope into patient bile duct as in a DPOC procedure, and a portion of patient anatomy where the procedure is performed.
Figure 3B:
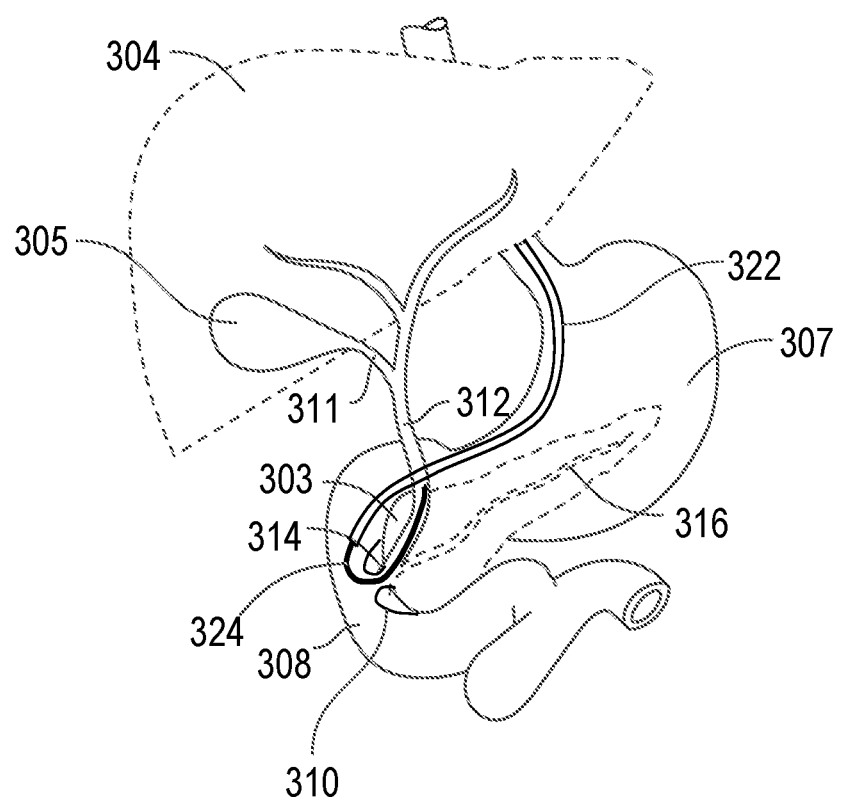

FIGS. 3A-3B are diagrams illustrating an example of peroral cholangioscopy performed via direct insertion of a cholangioscope 324 into the bile duct, as in a DPOC procedure, and a portion of patient anatomy where the procedure is performed. The cholangioscope 324 is nested inside of a guide sheath 322, and inserted perorally into a patient to reach duodenum 308. Duodenum 308 comprises an upper part of the small intestine. The guide sheath 322 can extend into mouth 301, through esophagus 306, through stomach 307 to reach the duodenum 308. Before reaching intestines 309, the guide sheath 322 can position the cholangioscope 324 proximate common bile duct 312. The common bile duct 312 carries bile from the gallbladder 305 and liver 304, and empties the bile into the duodenum 308 through sphincter of Oddi 310 (FIG. 3B). The cholangioscope 324 can extend from guide sheath 322 to extend into common bile duct 312. In some examples, steering features of guide sheath 322 (e.g., pull wire) can be used to facilitate navigating and bending of cholangioscope 324 through stomach 307, in addition to direct steering of cholangioscope 324 via the pull wires. For example, navigation of the Pyloric canal and Pyloric sphincter can be difficult to navigate using only an endoscope. Thus, the guide sheath 322 can be used to turn or bend elongate body of cholangioscope 324, or reduce the amount of steering or bending of the elongate body of the cholangioscope 324 required by pull wires, to facilitate traversing the Pyloric sphincter.

FIG. 3B is a schematic view of duodenum 308 connected to common bile duct 312 via duodenal papilla 314. Common bile duct 312 can branch off into pancreatic duct 316 and gallbladder duct 311. Duodenal papilla 314 can include sphincter of Oddi 310 that controls flow of bile and pancreatic juice into the intestine (duodenum). Pancreatic duct 316 can lead to pancreas 303. Pancreatic duct 316 carries pancreatic juice from pancreas 303 to the common bile duct 312. Gallbladder duct 311 can lead to gallbladder 305. In some patients, it can be difficult to navigate surgical instruments to duodenal papilla 314. It can also be difficult to navigate a surgical instrument into common bile duct 312 via insertion through duodenal papilla 314. Therefore, it is common during medical procedures to cut sphincter of Oddi 310 to enlarge duodenal papilla 314 to allow for easier access of instrument into common bile duct 312.

FIG. 4 is a diagram illustrating an example of mother-daughter endoscopes used in an ERCP procedure, and a portion of patient anatomy where the procedure is performed. The mother-daughter endoscopes comprise an auxiliary scope 434 (cholangioscope) attached to and advanced through a lumen 432 of a main scope 400 (duodenoscope). The auxiliary scope 434 can comprise a lumen 436. The distal portion of the main scope 400 positioned in duodenum 308 comprises a functional module 402, an insertion section module 404, and a control module 406. The control module 406 can include, or be coupled to, a controller 408. Similar to the discussion above with respect to FIG. 1, the control module 406 can include other components, such as those described with reference to endoscopy system 10 (FIG. 1) and control unit 16 (FIG. 2). Additionally, the control module 406 can comprise components for controlling an imaging device (e.g., a camera) and a light source connected to the auxiliary scope 434, such as an imaging unit 410, a lighting unit 412 and a power unit 414. The main scope 400 can be configured similarly as endoscope 14 of FIGS. 1 and 2.

The functional module 402 of the main scope 400 can comprise an elevator portion 430. The auxiliary scope 434 can itself include functional components, such as camera lens 437 and a light lens (not illustrated) coupled to control module 406, to facilitate navigation of the auxiliary scope 434 from the main scope 400 through the anatomy and to facilitate viewing of components extending from lumen 432.

In ERCP, the auxiliary scope 434 can be guided into the sphincter of Oddi 310. Therefrom, a surgeon operating the auxiliary scope 434 can navigate the auxiliary scope 434 through the lumen 432 of the main scope toward the gallbladder 305, liver 304, or other locations in the gastrointestinal system to perform various procedures. In some examples, the auxiliary scope 434 can be used to guide an additional device to the anatomy to obtain biological matter (e.g., tissue), such as by passage through or attachment to lumen 436.

The biological sample matter can be removed from the patient, typically by removal of the additional device from the auxiliary device, so that the removed biological matter can be analyzed to diagnose one or more conditions of the patient. According to several examples, the mother-daughter endoscope assembly (including the main scope 400 and the auxiliary scope 434) can include additional device features, such as forceps or an auger, for gathering and removing cancerous or pre-cancerous matter (e.g., carcinoma, sarcoma, myeloma, leukemia, lymphoma and the like), or performing endometriosis evaluation, biliary ductal biopsies, and the like.

The controller 408 can include, or be coupled to, an integrated 3D image generator 450, and a treatment plan generator 460. As mentioned above, ERCP relies on 2D images (e.g., endoscopic images and fluoroscopy images) to guide cannulation and endoscope navigation. Such 2D images may not provide information about direct 3D properties such as shape, depth, or structure of anatomy of interest. To better recognize and appreciate the shape of target anatomy (e.g., duodenal papilla and ducts in the pancreaticobiliary system) and topology of the nearby region, the operating physician is generally required to imagine the 3D image based on the 2D images obtained from different sources. This puts a higher demand on physician skills and experiences and may introduce inter-physician interpretation variation. The integrated 3D image generator 450 can help solve this problem by providing a 3D image reconstructed from the 2D images acquired by the same or different modalities. The integrated 3D image generator 450 can also integrate the reconstructed 3D image with other secondary image sources, such as a CT image, an MRI image such as obtained from a Magnetic resonance cholangiopancreatography (MRCP) procedure, or an endoscopic ultrasonography (EUS) image. The reconstructed or integrated images may be presented to the operating physician in real time to assist in cannulation and endoscope navigation. For example, the operating physician can identify in real time an optimal route of cannulation and subsequent procedures (e.g., endoscopic submucosal dissection of tissue or other biological mass).

The treatment plan generator 460, which is an example of the treatment generator 44 as illustrated in FIG. 2, can automatically generate a treatment plan, such as an endoscope navigation plan, based at least on the reconstructed and/or integrated images of the patient anatomy. The endoscope navigation plan can include one or more cannulation or navigation parameters with respective values. By way of example and not limitation, the cannulation or navigation parameters may include a position of the endoscope distal portion (e.g., the functional section 30 of the endoscope 14 as shown in FIG. 1) relative to an anatomical target of interest, such as a distance from the endoscope distal portion to duodenal papilla, a heading direction of the endoscope distal portion relative to the anatomical target, an angle of a cannula or a surgical element used in cannulation, a protrusion amount of a cannula or a surgical element, a speed or force applied to the endoscope distal portion or a surgical element, a rotational direction or a cutting area of a surgical element, among others, or a projected navigation path toward the anatomical target of interest, among others. According to various examples, the endoscope navigation plan (including, for example, cannulation or navigation parameters values) can be generated or updated using a trained machine-learning (ML) model as further described below. The endoscope navigation plan (in some embodiments, along with the reconstructed or integrated images) may be presented to the operating physician as a procedure guide. The multi-modality 3D image reconstruction and the image-guided navigation planning as described in this disclosure can improve endoscopic procedure success rate and patient outcome.

Figure 5:
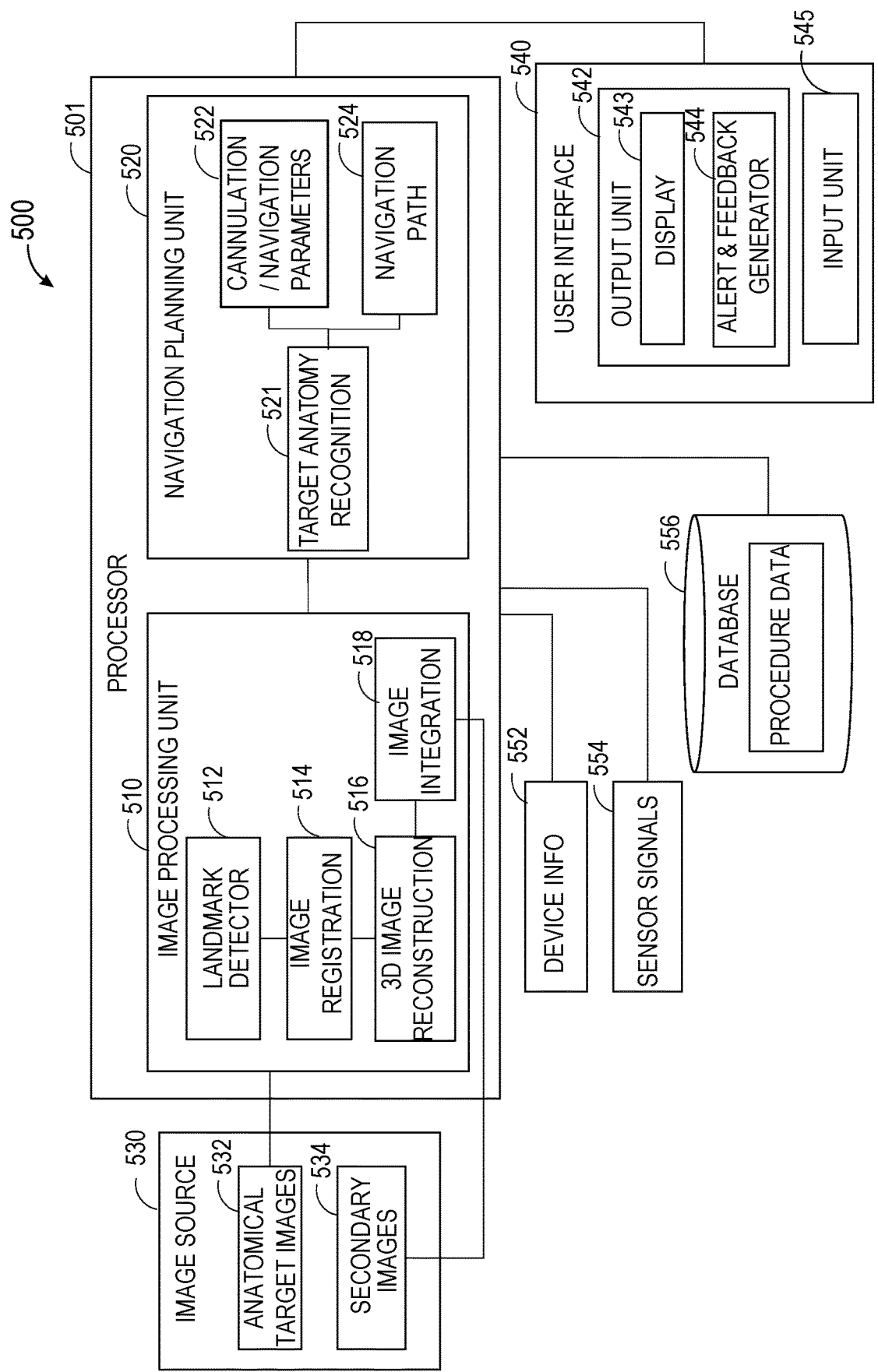
FIG. 5 is a diagram illustrating an example of an image-guided navigation system.

FIG. 5 is a diagram illustrating an example of an image-guided navigation system 500, which can be a part of the control unit 16 in FIG. 1, or the controller 408 and other devices or functional units associated with the respective controllers such as the integrated 3D image generator 450 and the treatment plan generator 460.

The image-guided navigation system 500 can include a processor 501, an image source 530, and a user interface device 540. The processor 501 may include circuit sets comprising one or more other circuits or sub-circuits, including an image processing unit 510 and a navigation planning unit 520. These circuits may, individually or in combination, perform the functions, methods, or techniques described herein. In an example, the processor 501 and the circuit sets therein may be implemented as a part of a microprocessor circuit, which may be a dedicated processor such as a digital signal processor, application specific integrated circuit (ASIC), microprocessor, or other type of processor for processing information including physical activity information. Alternatively, the microprocessor circuit may be a general-purpose processor that may receive and execute a set of instructions of performing the functions, methods, or techniques described herein. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

The image processing unit 510, which is an example of the integrated 3D image generator 450, may receive, from the image source 530, anatomical target images 532 (also referred to as "inherent" target images), and reconstruct a 3D image using the anatomical target images 532. In an example, the target images 532 may include 2D images acquired during an endoscopic procedure, such as an ERCP procedure or a DPOC procedure as described above with reference to FIGS. 3A-3B and FIG. 4, respectively. Examples of the 2D images include endoscopic images or endoscopic video frames captured by an imaging device (e.g., a camera) coupled to the endoscope (e.g., the cholangioscope 324, or the mother-daughter endoscope assembly comprising the main scope 400 or the auxiliary scope 434), and X-ray or fluoroscopy images of an anatomical target and nearby environment acquired before or during the endoscopic procedure. In an example, the target images 532 may include an electrical potential map or an electrical impedance map of the patient anatomy. As soft tissue, liquid, and gas in an endoluminal structure have different electrical properties, electrical signals sensed therein (e.g., potential, impedance, or signal frequencies) may change depending on the presence and distribution of tissue, liquid, or gas. The image processing unit 510 can infer anatomical information from the electrical potential map or an electrical impedance map, and reconstruct the 3D image of the anatomical target using the inferred anatomical information.

The image source 530 may include secondary images 534 (to distinguish from the inherent target images 532), including, for example, CT images, MRI images such as MRCP images, or acoustic images such as EUS images, among others. The secondary images may be integrated with the inherent target images 532, or the reconstructed 3D images.

The image processing unit 510 can include a landmark detector 512, an image registration unit 514, and a 3D image reconstruction unit 516. The landmark detector 512 can recognize from each of the received images (e.g., the target images 532 and the secondary images 534) a landmark that may be used for image alignment or registration. The landmark can have a known geometry, location, or the spatial characteristics. Examples of the landmark can include intrinsic tissue of interest (e.g., duodenal papilla), other tissue (e.g., duodenum wall, or bony structures on a fluoroscopy image or other secondary image modalities), or an artificial extrinsic object placed in the surgical area and recognizable from the received images. The landmark detect 512 can detect and localize the landmark using an image processing algorithm (e.g., edge detection), and extract geometric features or other spatial characteristics of the landmark. In some example, the landmark detector 512 may detect multiple landmarks from each of the received images. Multiple landmarks may increase the probability of identifying matching landmarks between images, and improve image alignment and registration accuracy.

The image registration unit 514 may align the received target images 532 with respect to respective landmarks detected from the received images. The image registration may include identifying one or more matching landmarks from each or two or more images, performing transformation on one or more images into a common coordinate system, and aligning one image (source) to another image (target) with respect to the matching landmarks. The image transformation can include linear transformations (e.g., rotation, scaling, translation, and other affine transforms), and nonrigid transformations (e.g., radial basis functions, physical continuum models, and large deformation models).

The 3D image reconstruction unit 516 may reconstruct a 3D image using a plurality of images of an anatomical target, such as two or more of the registered 2D images, and a reconstruction model. As mentioned above, the 2D images may be from the same or different sources with the same or different modalities, such as endoscopic images, X-ray or fluoroscopy images, or electrical potential map or impedance map. In an example, the plurality of images used for reconstructing the 3D image may include one or more real-time endoscopic images. In another example, the plurality of images used for reconstructing the 3D image may include at least one existing 3D image obtained by using, for example, an external imaging device of equipment, such as a CT scanner, an MRI scanner, X-ray equipment, or a nuclear-medicine camera, among others.[2] For example, the 3D image reconstruction unit 516 can reconstruct a 3D image using at least one 2D image and at least one existing 3D image, or in another example, using at least two existing 3D images. In an example, the reconstruction model is an auto-calibration model to recover the camera motion and parameters. In another example, the reconstruction model is a stratification model to progressively upgrade the projected 2D structure to a Euclidean reconstruction with prior constraints. Other examples of the reconstruction model may include discrete linear transform based on stereo corresponding points, surface rendering technique, among others.

[2] Echoing new claim 1

The 3D image can be generated, and updated during the endoscopic procedure. In some examples, the 3D image reconstruction unit 516 may generate a 3D image before the endoscope procedure. In some examples, the 3D image may be reconstructed using X-ray images or stored endoscopic images from past procedures performed on patients having similar anatomy or medical condition to the target patient. In some examples, the reconstruction of 3D image includes creating cross-section views of the target anatomy along different directions. The cross-section view can be displayed along a user specified direction. Once the 3D image is created, the user can use the map for an existing area to explore another area within the image.

The image integration unit 518 can integrate images from various sources into one image for use in cannulation or navigation planning. In the illustrated example, the image integration unit 518 can integrate the reconstructed 3D image with one or more secondary images 534. As stated above, the 3D image can be reconstructed from registered 2D images (aligned with respect to respective landmarks) and registered secondary images (aligned with respect to respective landmarks). In an example, integrating images of different sources may include superimposing the reconstructed 3D image over one or more secondary images with the respective landmarks properly aligned.

As illustrated in FIG. 5, additional information, including endo-therapeutic device information 552 and/or sensor signals 554, may be used in image integration. Examples of the endo-therapeutic device information 552 may include dimension, shape, and structures of the endoscope (or a portion thereof such as the functional section) used in an ERCP procedure, as shown in FIGS. 1 and 4. The sensor signals 554 may be acquired by sensors coupled to the endoscope, or otherwise associated with the patient. An example of the sensor signals 554 may include direction and proximity of duodenal papilla as sensed by a proximity sensor at the tip of an endoscope.

The navigation planning unit 520 may generate an endoscope navigation plan with respect to an anatomical target of interest (e.g., duodenal papilla) using the reconstructed or integrated 3D images of the patient anatomy, such as generated by the image processing unit 510. The navigation planning unit 520 can include a target anatomy recognition unit 521 to automatically recognize the anatomical target and determine its location from the reconstructed or integrated 3D image such as by using a template matching technique, where geometric features (e.g., edges) or other spatial characteristics of a portion of the reconstructed or integrated 3D image may be compared to an anatomical target template to determine a morphological similarity or a distance in a feature space. Alternatively, the anatomical target of interest may be identified manually by the user such as from the reconstructed or integrated 3D images displayed on a user interface. The navigation plan may include one or more preferred cannulation or navigation parameters 522, including, for example: a position of the endoscope distal portion (e.g., the functional section 30 of the endoscope 14 as shown in FIG. 1) relative to an anatomical target of interest, such as a distance from the endoscope distal portion to duodenal papilla, a heading direction of the endoscope distal portion relative to the anatomical target, an angle of a cannula or a surgical element used in cannulation, a protrusion amount of a cannula or a surgical element, a speed or force applied to the endoscope distal portion or a surgical element, or a rotational direction or a cutting area of a surgical element, among others. In some examples, the navigation plan may include a projected navigation path 524 toward the anatomical target of interest.

In various examples, the endo-therapeutic device information 552 and/or the sensor signals 554 discussed above for generating the integrated image may also be used to determine one or more of the preferred cannulation or navigation parameters 522 or the projected navigation path 524.

In some examples, artificial intelligence (AI) technology may be used by the image processing unit 510 to generate reconstructed or integrated 3D images from various image sources, or used by the navigation planning unit 520 to generate an endoscope navigation plan. A machine-learning (ML) model may be trained using procedure data stored in a database 556, including images of different modalities, acquired from multiple patients in prior endoscopic procedures of the same or similar type. The ML model may be trained using supervised learning, unsupervised learning, or reinforcement leaning. Examples of ML model architectures and algorithms may include, for example, decision trees, neural networks, support vector machines, or a deep-learning networks, etc. Examples of deep-learning networks include a convolutional neural network (CNN), a recurrent neural network (RNN), a deep belief network (DBN), or a hybrid neural network comprising two or more neural network models of different types or different model configurations. In an example, the training of a ML model may include constructing a training dataset using selected procedure data of endoscopic procedures performed on a plurality of patients. In an example, the training data can be screened such that only data of procedures performed by experienced physicians, and/or data of procedures on patients with anatomies or medical conditions similar to the present patient, are included in the training dataset. The training of the ML model may be performed continuously or periodically, or in near real time as additional procedure data are made available. The training involves algorithmically adjusting one or more ML model parameters, until the ML model being trained satisfies a specified training convergence criterion.

In an example, a first ML model may be trained to determine, for a given set of images of a patient, optimal parameters used for landmark detection, image registration (e.g., transformation and alignment), and spatial fusion of the registered images (e.g., 3D image reconstruction and integration of images of different modalities). Alternatively, the first ML model may be trained to directly map the input images (optionally along with other information such as the endo-therapeutic device information and/or sensor information) to a reconstructed or integrated 3D model. In an example, the 3D image reconstruction unit 516 can take at least two 2D images as input, and use a Simultaneous Localization and Mapping (SLAM) method to generate 3D point positions and a camera trajectory. Deep-learning networks, such as CNN or RNN, can be used for SLAM tasks and to predict depth and camera poses and trajectories, which in turn can be used in reconstructing 3D images. The first trained ML model can be validated, and implemented in an AI-based image integration and navigation planning platform. The image integration unit 518 may apply a set of multi-modality images of the patient (optionally along with the endo-therapeutic device information 552 and/or the sensor signals 554) to the first trained ML model to generate an integrated image.

In another example, a second ML model may be trained to establish a relationship between images or image features representing variants of the patient anatomy and endoscope navigation plans (e.g., cannulation or navigation parameters, navigation path) for the variants of the patient anatomy. In an example, the second ML model can be trained using video recordings of previously performed procedures. The second trained ML model can be validated, and implemented in the AI-based image integration and navigation planning platform. The navigation planning unit 520 may apply the reconstructed or integrated 3D images of the patient anatomy (optionally along with the endo-therapeutic device information 552 and/or the sensor signals 554) to the second trained ML model to generate the endoscope navigation plan.

In some examples, AI technology may be used to determine an endo-therapeutic device to be used in an endoscopic procedure in a patient based on the patient's anatomy. An ML model may be trained to establish a relationship between (i) images or image features representing variants of patient anatomy, and (ii) endo-therapeutic devices (with respective sizes, shapes, and configurations) as used in respective endoscopic procedures that yield satisfactory outcomes (e.g., satisfying procedure efficacy and/or efficiency criteria). Such trained ML model can be validated, and implemented in the AI-based image integration and navigation planning platform. To plan an endoscopic procedure for a patient, the navigation planning unit 520 may apply the reconstructed or integrated 3D images of the patient to the trained ML model to determine an appropriate endo-therapeutic device for the patient.

The user interface device 540 can include an output unit 542 and an input unit 545, which are examples of the output unit 18 and the input unit 20 respectively as shown in FIG. 2. The output unit 542 can include a display 543 that can display the reconstructed or integrated 3D images of the patient anatomy such as generated by the image processing unit 510. In some examples, the display 543 can present a visual presentation of the endoscope navigation plan such as generated by the navigation planning unit 520.

In some examples, the displayed region of the reconstructed or integrated 3D images can be automatically adjusted in accordance with the endoscope navigation plan. In addition, the display 543 may display the real-time 3D image of the patent's anatomy during the procedure. Further, the output unit 542 may automatically zoom in or zoom out a region in the image of the patient anatomy based on a position or direction of a distal end of the endoscope relative to an anatomical target. For example, the output unit 542 may automatically zoom in an image as the endoscope tip gets closer to duodenal papilla to show more structural details. Alternatively, the zooming function can be activated and adjusted manually by the user (e.g., operating physician) via the input unit 545. In an example, the output unit 542 can display a cross-section view of an anatomy in a direction specified by a user, such as via the input unit 545. In an example, the user may adjust viewing angle (e.g., rotating the view) via the input unit 545 to have a substantially 360-degree view of the reconstructed or integrated 3D images. In an example, at least a portion of the input unit 545 can be incorporated into the endoscope, such as the handle section 32 of endoscope 14, to facilitate user control of the viewing area and viewing angle during the procedure.

In some examples, the output unit 542 may display, on the reconstructed or integrated 3D images of the patient anatomy, one or more of visual indication of one or more of an anatomical target, a projected navigation direction/path toward the anatomical target, or a progress of the endoscope advancing toward the anatomical target along the projected navigation path. Display settings can be adjusted by the user via the input unit 545. The visual indication may take the format of markers, annotations (e.g., icons, texts, or graphs), highlights, or animation, among other visual indicators. In an example, markers of different shapes, colors, forms, or sizes can be displayed over the reconstructed or integrated image to differentiate different tissue, anatomical regions, their accessibility, or vulnerability to protrusion force exerted by endoscope tip. An example of image-guided cannulation is discussed below with reference to FIGS. 6A-6B.

The output unit 542 can include an alert and feedback generator 544 that can generate an alert, a notification, or other type of human-perceptible feedback on the status or progress of the cannulation or navigation in reference to the navigation plan. For example, an alert can be generated to indicate a risk of tissue damage associated with improper cannulation. The feedback can be in one or more forms of audio feedback, visual feedback, or haptic feedback. For example, a proximity sensor on the endoscope can measure a distance to a critical anatomical target. When the endoscope tip enters or comes closer to a "critical zone" as indicated by the measured distance being shorter than a threshold, the critical zone can be displayed in different colors to represent the proximity of the endoscope tip to the anatomical target, such as a green zone, a yellow zone, and a red zone as the endoscope gets closer and closer to the anatomical target. Additionally or alternatively, human-perceptible haptic feedback such as touch or vibration may be generated and provided to the operating physician. The alert and feedback generator 544 can automatically adjust the vibration strength according to the distance to the critical zone. For example, a low vibration can be generated when the endoscope tip is in a green zone. If the system predicts, based on present advancing speed and direction of the endoscope, that the endoscope tip will reach the critical zone in a time less than a predetermined threshold, then the alert and feedback generator 544 can apply moderate vibration when the endoscope tip reaches the yellow zone, and apply high vibration when the endoscope tip reaches the red zone to indicate a heightened risk of tissue damage.

In an example, the projected navigation path 524 for an endoscope (or other steerable elongate instrument such as a guidewire) can be displayed in one color and overlaid upon the pre-operative images. Once insertion of the endoscope starts, the actual, live navigation path can be displayed in a different color over the planned navigation path. In case that the actual navigation path substantially deviates from the planned navigation path, an alert may be generated to notify the physician such effect. Cannulation or navigation parameters, such as distance to duodenal papilla, can be displayed in real-time on the display 543 to indicate the progress of the procedure. In some examples, the output unit 542 may provide real-time recommendations for adjusting the cannulation or navigation. Once the cannulation is completed successfully, an audio, visual, or haptic confirmation can be generated and provided to the physician. The image-guided endoscopic procedure and real-time alert and feedback as described in this disclosure can improve cannulation and endoscope navigation accuracy and efficiency and procedure success rate, especially for inexperienced physicians.

Figure 6C:
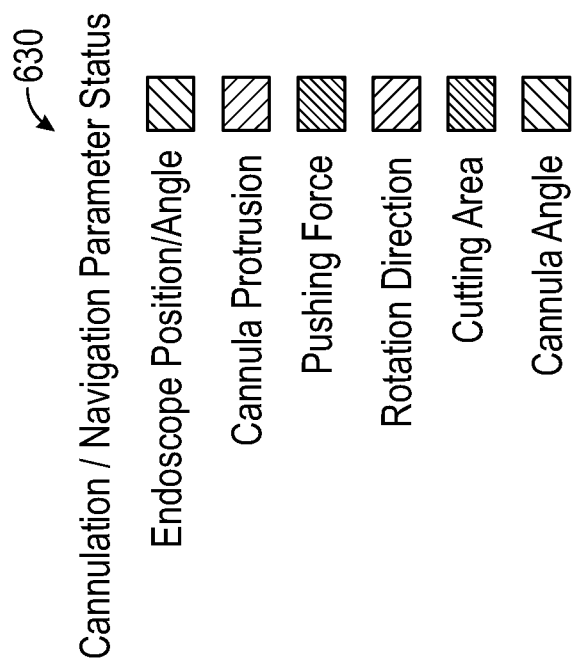
FIGS. 6A-6D are diagrams as shown in a user interface that illustrate examples of an image-guided cholangioscopic procedure.
Figure 6B:
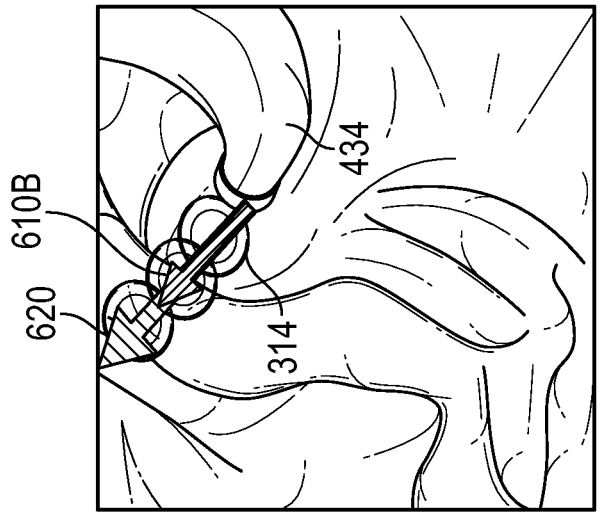
Figure 6A:
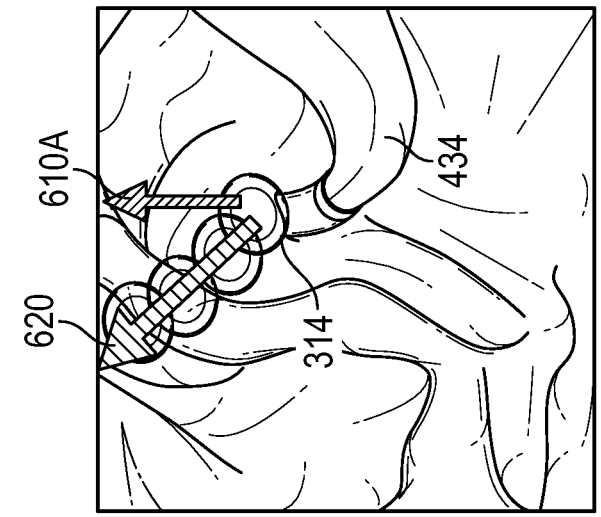

FIGS. 6A-6D illustrate examples of an image-guided endoscopic procedure, such as a cholangioscopic procedure (e.g., a ERCP or a DPOC procedure). Images of patient anatomy, such as a reconstructed or integrated 3D image generated by the image processing unit 510, can be displayed on the display 543. In FIG. 6A, the displayed image illustrates duodenal papilla 314, the target anatomy for cannulation, and the cholangioscope 434 and its current position and direction 610A relative to the duodenal papilla 314. The displayed image also shows a preferred navigation direction 620 (e.g., by an arrow) for the cholangioscope 434, which can be one of the preferred cannulation or navigation parameters 522 determined by the navigation planning unit 520. In addition to the visual indicator of the preferred navigation direction 620, other cannulation or navigation parameters, such as the distance from the cholangioscope tip to duodenal papilla, the direction of a cholangioscope tip relative to the duodenal papilla, the desired speed or force applied to cholangioscope tip, may also be displayed in a textual or graphical format. The visual indications as shown in FIG. 6A may serve as a roadmap to guide the operating physician during the procedure. As discussed above, real-time update on the status or progress of the cannulation or navigation in reference to the navigation plan can be generated and provided to the operating physician. In case that the cannulation or navigation deviates from the navigation plan, an alert or feedback may be generated. In FIG. 6A, a heading direction 610A of the cholangioscope 434 is substantially misaligned with the preferred navigation direction 620 (e.g., exceeding a preset alignment margin). Accordingly, visual, audio, or haptic feedback or alert may be generated to remind the operating physician to adjust the cannulation or navigation accordingly. In FIG. 6B, after proper adjustment, the adjusted heading direction 610B of the cholangioscope 434 is substantially aligned with the preferred navigation direction 620. An audio, visual, or haptic feedback can be generated and provided to the physician to confirm a successful cannulation.

FIG. 6C illustrates a navigation parameter status chart 630 that can be displayed on the display 543 to show how well the real-time measured cannulation or navigation parameters are in agreement with preferred cannulation or navigation parameter values as determined by the navigation planning unit 520. In case a real-time cannulation or navigation parameter substantially deviates from the preferred value by an amount exceeding a specified margin, an alert or feedback may be generated. In the illustrated example, different colors are used to visually represent levels of agreement between the real-time cannulation or navigation parameters and the corresponding preferred values. For example, a green color is to indicate the real-time parameter value being within the margin of the preferred value, yellow to indicate the borderline parameter value, and red to indicate the real-time parameter value exceeding the margin of the preferred value and accordingly an elevated risk of tissue damage. Other forms of visual, audio, or haptic feedback or alert may be used to remind the operating physician to adjust the cannulation or navigation accordingly. In some examples, the output unit 542 may provide real-time recommendations for adjusting the cannulation or navigation. For example, if the cannula angle in the real-time image substantially deviates from the preferred cannula angle, a message may pop up on the display, e.g., "Rotate the cannula 30 degree more in clockwise." Once the cannulation is completed successfully, an audio, visual, or haptic confirmation can be generated and provided to the physician.

Figure 6D:
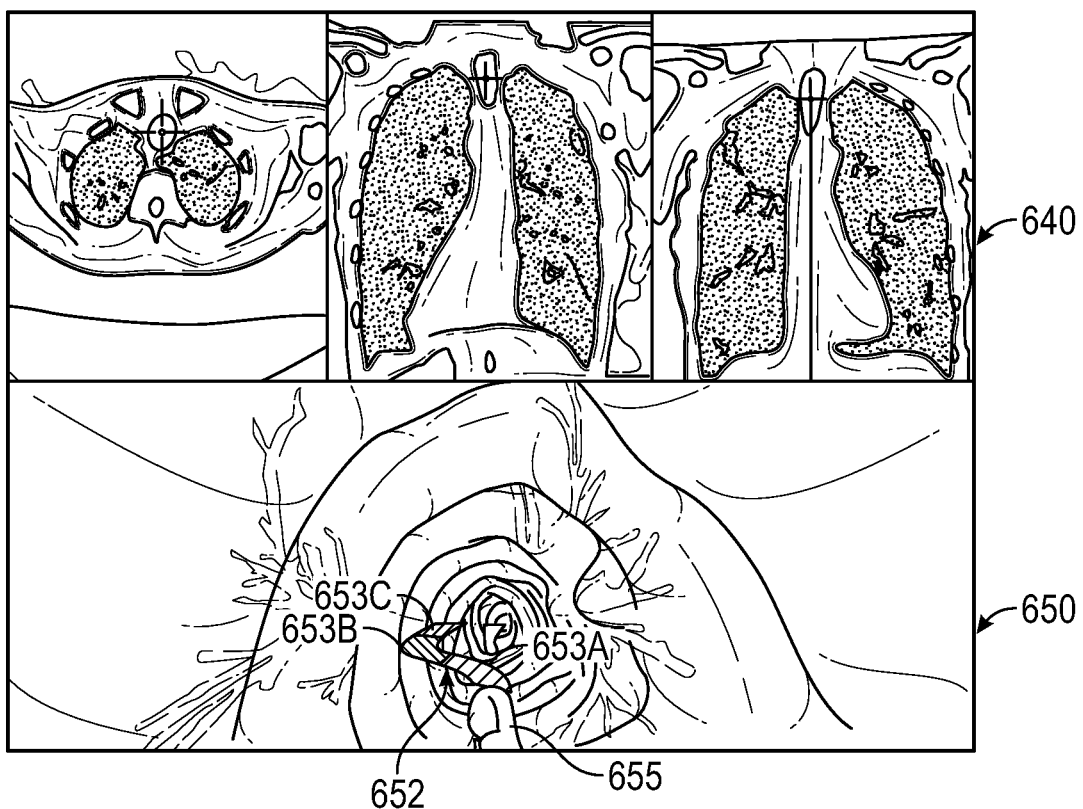

FIG. 6D illustrates an image-guided endoscopic procedure where a 2D or a 3D (2D/3D) image 650 can be displayed on the same screen of the display 543 together with one or more existing images 640 (e.g., CT or EUS images). In an example, the 2D/3D image 650 can be a 3D endoscopic image reconstructed by the image processing unit 510. The existing images 640 may be generated from different imaging systems with different modalities than the 2D/3D image 650. The 2D/3D image 650 and the existing images 640 can be displayed side by side as shown in the illustrate example. Alternatively, the 2D/3D image 650 and the existing images 640 can be calibrated, registered, and overlaid on top of each other. Also shown in the 2D/3D image can include a projected navigation path 652 for an endoscope. As described above with reference to FIG. 5, as the endoscope tip 655 enters or comes closer to a "critical zone" (such as based on the distance to an anatomical target), the projected navigation path 652 can be displayed in different colors for different sections along the path to represent the proximity to an anatomical target. In the illustrated example, the projected navigation path 652 comprises a first section 653A in green, a second section 653B in yellow, and a third section 653C in red as the endoscope tip 655 gets closer to the anatomical target.

Figure 7:
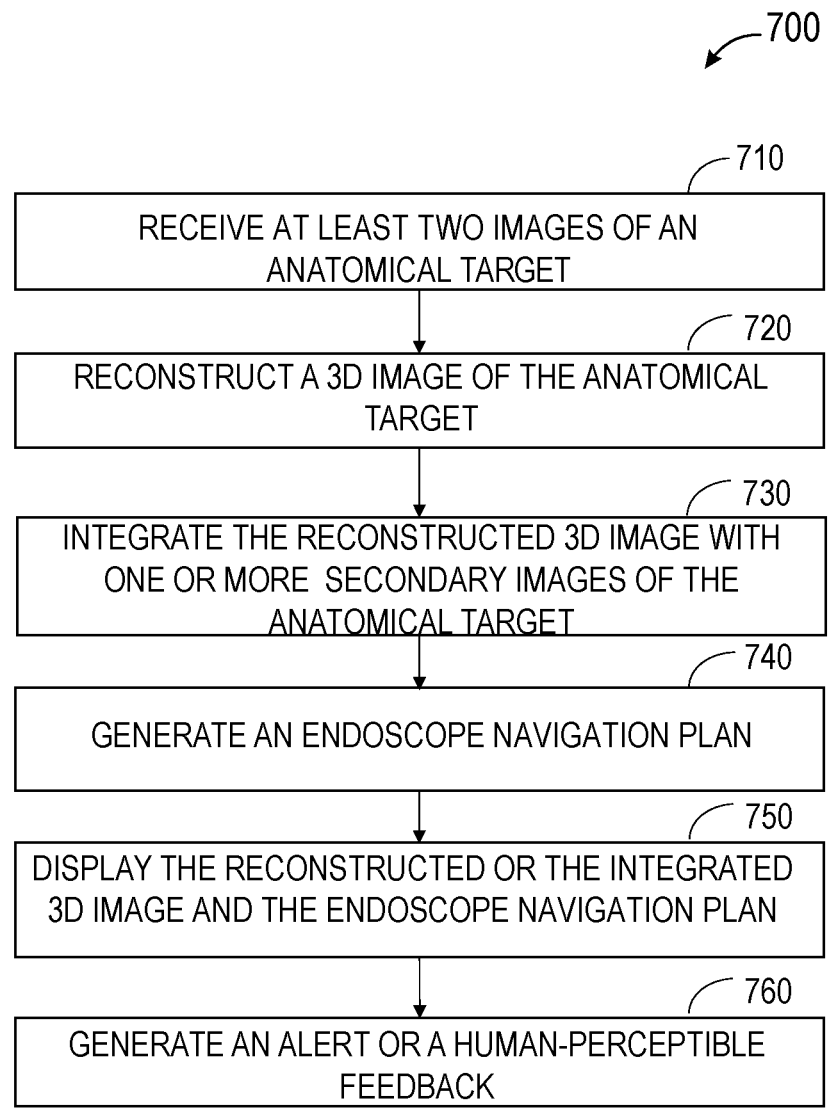
FIG. 7 is a flow chart illustrating an example method for constructing a 3D image and integrating images from various sources for use in an image-guide endoscopic procedure.

FIG. 7 is a flow chart illustrating an example method 700 for constructing a 3D image and integrating images from various sources for use in an image-guide endoscopic procedure. The method 700 may be implemented in and executed by the image-guided navigation system 500. Although the processes of the method 700 are drawn in one flow chart, they are not required to be performed in a particular order. In various examples, some of the processes can be performed in a different order than that illustrated herein.

At 710, at least two image of an anatomical target can be provided for use in an image-guided endoscopic procedure. The at least two images may include, in an example, first and second two-dimensional (2D) images. Examples of the 2D images may include endoscopic images or endoscopic video frames captured by an imaging device, X-ray or fluoroscopy images of an anatomical target and nearby environment acquired before or during the endoscopic procedure, or electrical potential map or an electrical impedance map of the patient anatomy. In an example, the second 2D image may be of a different modality than the first 2D image.

At 720, a three-dimensional (3D) image of the anatomical target can be reconstructed using the at least two images, such as the first and second 2D images. In an example, to reconstruct the 3D image, the first and second 2D images may be calibrated, and aligned to register one image to the other with respect to respective landmarks detected from the first and second 2D images. that may be used for image. One or both of the first and second 2D images may be transformed into a common coordinate system. A reconstruction model may be used to create a 3D image from the registered and transformed 2D images.

The 3D image can be generated, and updated during the endoscopic procedure. In some examples, the 3D image can be generated before the endoscope procedure using X-ray images or stored endoscopic images from past procedures performed on patients having similar anatomy or medical condition to the target patient. In some examples, the reconstruction of 3D image includes creating cross-section views of the target anatomy along different directions.

In various examples, the 3D image may be reconstructed using a machine-learning (ML) model. In an example, the 3D image may be reconstructed using a Simultaneous Localization and Mapping (SLAM) method, where deep-learning networks, such as CNN or RNN, can be used for SLAM tasks and to predict depth and camera poses and trajectories.

At 730, one or more secondary images of the anatomical target, such as images of the anatomical target generated by imaging devices other than the endoscope, can be integrated with the reconstructed 3D image, such as by using the image integration unit 518. Examples of the secondary images may include CT images, MRI images such as MRCP images, or acoustic images such as EUS images, among others. In an example, integrating images of different sources may include superimposing the reconstructed 3D image over one or more secondary images with the respective landmarks properly aligned. In another example, a set of multi-modality images of the patient (such as selected from the first and second 2D images, the reconstructed 3D image, and one or more secondary images), optionally along with endo-therapeutic device information and/or the sensor signals (as shown in FIG. 5), can be applied to a trained machine-learning model to generate an integrated image.

At 740, the reconstructed 3D image from step 720, or the integrated image from step 730, can be used to generate an endoscope navigation plan for positioning and navigating the endoscope. This may include recognizing the anatomical target from the reconstructed or integrated 3D image, and estimating one or more navigation parameters. Examples of the navigation parameters may include a position of the endoscope distal portion relative to an anatomical target of interest, such as a distance from the endoscope distal portion to duodenal papilla, a heading direction of the endoscope distal portion relative to the anatomical target, an angle of a cannula or a surgical element used in cannulation, a protrusion amount of a cannula or a surgical element, a speed or force applied to the endoscope distal portion or a surgical element, a rotational direction or a cutting area of a surgical element, or a projected navigation path toward the anatomical target of interest. In an example, the reconstructed or integrated 3D images of the patient anatomy, optionally along with the endo-therapeutic device information and/or the sensor signals, may be applied to a trained machine-learning model to generate the endoscope navigation plan.

At 750, the reconstructed or integrated 3D image may be displayed on an output unit. A visual presentation of the endoscope navigation plan may also be displayed. In an example, visual indication of one or more of an anatomical target, a projected navigation path toward the anatomical target, or a progress of the endoscope advancing toward the anatomical target along the projected navigation path may be displayed overlaid upon the reconstructed or integrated 3D image. In an example, a portion of the reconstructed or integrated 3D image may be automatically zoomed based on a position or a direction of a distal portion of the endoscope relative to an anatomical target.

At 760, an alert, a notification, or other types of human-perceptible feedback may be generated and provided to the operating physician to indicate the status or progress of the cannulation or navigation in reference to the navigation plan. The feedback can be in one or more forms of audio feedback, visual feedback, or haptic feedback. In an example, a distance to a critical anatomical target can be measured using a proximity sensor on the endoscope, or estimated from the endoscopic image. When the endoscope tip enters or comes closer to a "critical zone", the critical zone can be displayed in different colors to represent the proximity of the endoscope tip to the anatomical target, such as a green zone, a yellow zone, and a red zone as the endoscope gets closer and closer to the anatomical target. In an example, a haptic feedback includes vibration on a handle portion of the endoscope perceivable by the operating physician. The vibration can be automatically adjusted such that, for example, vibration becomes stronger as the distal portion of the endoscope gets closer to an anatomical critical zone.

Figure 8:
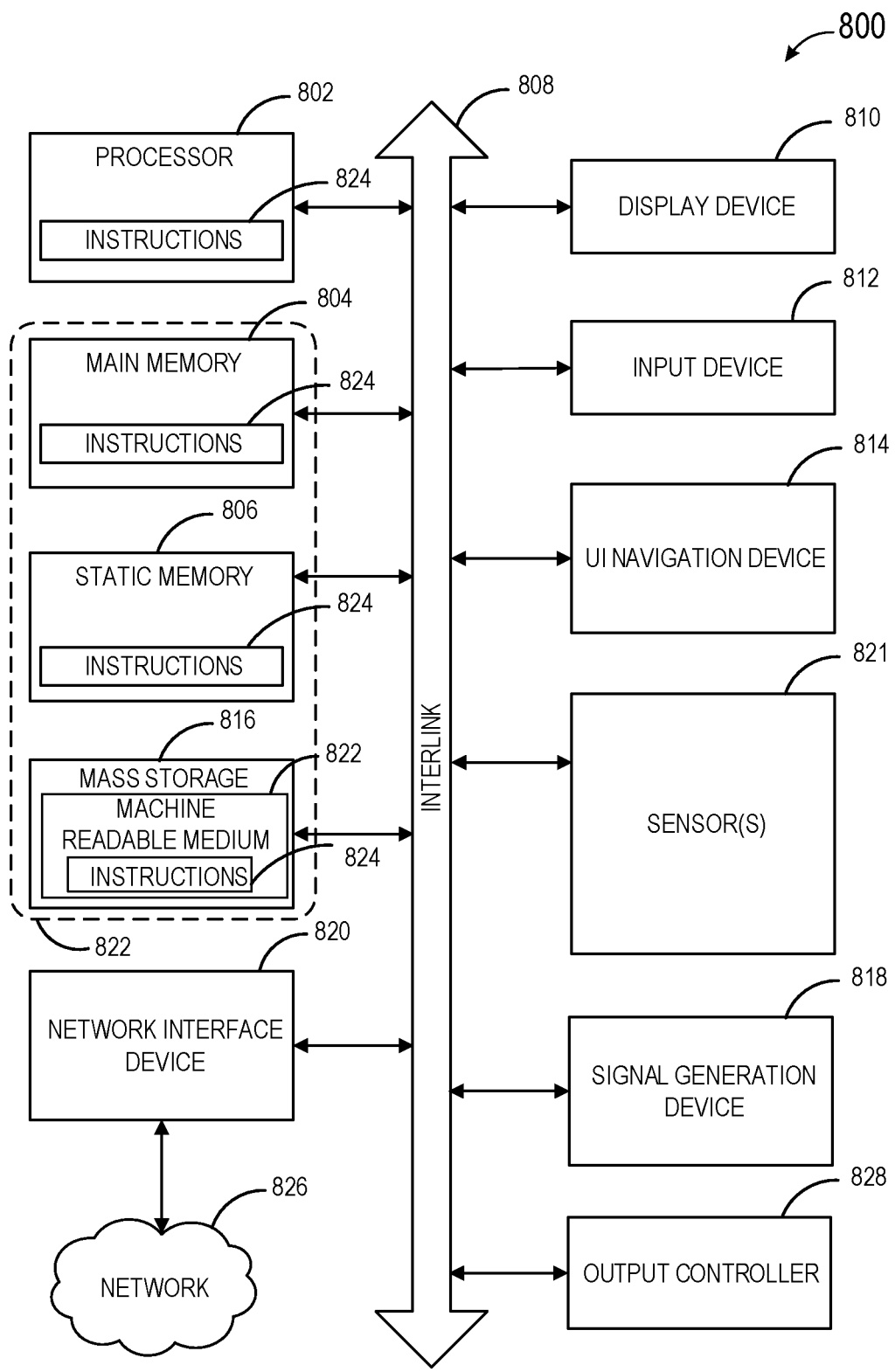
FIG. 8 is a block diagram illustrating an example machine upon which any one or more of the techniques (e.g., methodologies) discussed herein may perform.

FIG. 8 illustrates generally a block diagram of an example machine 800 upon which any one or more of the techniques (e.g., methodologies) discussed herein may perform. Portions of this description may apply to the computing framework of various portions of the image-guided navigation system 500, such as the image processing unit 510 and the navigation planning unit 520.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810 (e.g., a raster display, vector display, holographic display, etc.), an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensors. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine-readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPSOM)) and flash memory devices; magnetic disks, such as internal hard disks and removable disks; magneto-optical disks; and CD-ROM and DVD-ROM disks.

The instructions 824 may further be transmitted or received over a communication network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communication network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An image-guided endoscopic system, comprising:
    an endoscope configured to be positioned and navigated in a patient anatomy;
    a processor configured to:
        receive at least two images of an anatomical target;
        reconstruct a three-dimensional (3D) image of the anatomical target using the at least two received images; and
        generate an endoscope navigation plan for positioning and navigating the endoscope based at least on the reconstructed 3D image of the anatomical target;
    a display configured to display the reconstructed 3D image and the endoscope navigation plan; and
    an input unit configured to receive user input for controlling a viewing area and a viewing angle of the reconstructed 3D image, wherein the display is configured to automatically adjust at least one of the viewing area or the viewing angle of the display of the reconstructed 3D image in accordance with at least one of: i) the endoscope navigation plan or ii) a position or direction of a distal end of the endoscope relative to the anatomical target, and the user input received via the input unit, wherein the display is configured to automatically zoom in on a portion of the reconstructed 3D image as the distal end of the endoscope gets closer to the anatomical target, and wherein the processor is further configured to:
        determine a projected navigation path for the endoscope toward the anatomical target;
        display the projected navigation path on the display overlaid on the reconstructed 3D image;
        display a live navigation path on the display overlaid on the reconstructed 3D image as the endoscope moves; and
        generate an alert when the live navigation path deviates from the projected navigation path by at least one specified criterion.

2. The image-guided endoscopic system of claim 1, wherein to reconstruct the 3D image of the anatomical target, the processor is further configured to:
    detect respective landmarks from the at least two received images; and
    register one of the at least two received images to another of the at least two received images using the respective detected landmarks.

3. The image-guided endoscopic system of claim 1, wherein the endoscope includes an imaging sensor, and the at least two received images include at least one endoscopic image of the anatomical target generated by the imaging sensor.

4. The image-guided endoscopic system of claim 1, wherein the at least two received images include at least one fluoroscopic image of the anatomical target.

5. The image-guided endoscopic system of claim 1, wherein:
the at least two received images include at least one of at least one electrical potential map or an electrical impedance map of the anatomical target; and
the processor is configured to infer anatomical information from the electrical potential map or an electrical impedance map, and to reconstruct the 3D image of the anatomical target using the inferred anatomical information.

6. The image-guided endoscopic system of claim 1, wherein the at least two received images include first and second two-dimensional (2D) images.

7. The image-guided endoscopic system of claim 1, wherein the at least two received images include a first two-dimensional (2D) image and a second three-dimensional (3D) image.

8. The image-guided endoscopic system of claim 1, wherein the at least two received images include first and second three-dimensional (3D) images.

9. The image-guided endoscopic system of claim 1, wherein the at least two received images include images from different sources or with different modalities.

10. The image-guided endoscopic system of claim 1, wherein the processor is configured to:
receive one or more secondary images of the anatomical target generated by an imaging device other than the endoscope;
integrate the reconstructed 3D image with the one or more received secondary images; and
generate an updated endoscope navigation plan based at least on the integrated reconstructed 3D image of the anatomical target.

11. The image-guided endoscopic system of claim 10, wherein the one or more received secondary images includes one or more of:
a computer-tomography (CT) scan image;
a magnetic resonance imaging (MRI) scan image;
a magnetic resonance cholangiopancreatography (MRCP) image; or
an endoscopic ultrasonography (EUS) image.

12. The image-guided endoscopic system of claim 10, wherein the processor is further configured to:
generate the integrated reconstructed 3D image by superimposing the reconstructed 3D image over the one or more received secondary images, wherein the superimposing aligns corresponding features in the reconstructed 3D image and at least one of the one or more received secondary images.

13. The image-guided endoscopic system of claim 10, wherein the processor is further configured to:
generate the integrated reconstructed 3D image by applying the reconstructed 3D image and the one or more received secondary images to a trained machine-learning model.

14. The image-guided endoscopic system of claim 1, wherein to generate the endoscope navigation plan includes to automatically recognize the anatomical target and to estimate one or more navigation parameters including:
a distance of the distal end of the endoscope relative to an anatomical target;
a heading direction of the distal end of the endoscope relative to the anatomical target;
an angle of cannula or a surgical element;
a protrusion amount of a cannula or a surgical element;
a speed or force applied to the distal end of the endoscope or a surgical element;
a rotational direction or a cutting area of a surgical element; or
a projected navigation path toward the anatomical target.

15. The image-guided endoscopic system of claim 1, wherein the processor is configured to generate the endoscope navigation plan by applying the reconstructed 3D image to a trained machine-learning model, the trained machine-learning model being trained to establish a relationship between (i) one or more images or image features representing variants of the anatomical target, and (ii) one or more endoscope navigation plans for the variants of the anatomical target.

16. The image-guided endoscopic system of claim 15, wherein the processor is configured to train the machine-learning model using a training dataset comprising procedure data from past endoscopic procedures on a plurality of patients, the procedure data including (i) one or more images of anatomical targets of the plurality of patients and (ii) one or more corresponding endoscope navigation plans.

17. The image-guided endoscopic system of claim 1, wherein the display is configured to adjust the display of the reconstructed 3D image according to the endoscope navigation plan.

18. The image-guided endoscopic system of claim 17, wherein to adjust the display includes to automatically zoom a portion of the reconstructed 3D image based on a position or a direction of the distal end portion of the endoscope relative to an anatomical target to reveal a structural characteristic of the anatomical target, wherein the structural characteristic includes at least one of a shape, depth, or geometric feature of the anatomical target.

19. The image-guided endoscopic system of claim 1, wherein the display is further configured to display one or more visual indications overlaid upon the reconstructed 3D image, the one or more visual indications including:
the anatomical target;
a projected navigation path toward the anatomical target; or
a progress of the endoscope advancing toward the anatomical target along the projected navigation path.

20. An image-guided endoscopic system, comprising:
an endoscope configured to be positioned and navigated in a patient anatomy;
a processor configured to:
receive at least two images of an anatomical target;
reconstruct a three-dimensional (3D) image of the anatomical target using the at least two received images; and
generate an endoscope navigation plan for positioning and navigating the endoscope based at least on the reconstructed 3D image of the anatomical target;
a display configured to display the reconstructed 3D image and the endoscope navigation plan; and
a feedback generator configured to generate a human-perceptible feedback including one or more of an audio feedback, a visual feedback, or a haptic feedback when navigating the endoscope in or near the anatomical target, wherein the feedback generator is configured to automatically adjust a parameter of the human-perceptible feedback based on a distance between a distal portion of the endoscope and an anatomical critical zone, and wherein an intensity of the human-perceptible feedback progressively increases as the distal portion of the endoscope gets closer to the anatomical critical zone, and wherein the processor is further configured to:

determine a projected navigation path for the endoscope toward the anatomical target;

display the projected navigation path on the display overlaid on the reconstructed 3D image;

display a live navigation path on the display overlaid on the reconstructed 3D image as the endoscope moves; and generate an alert when the live navigation path deviates from the projected navigation path by a at least one specified criterion.

* * * * *